(12) United States Patent
Yamamoto et al.

(10) Patent No.: US 8,358,373 B2
(45) Date of Patent: Jan. 22, 2013

(54) IMAGE DISPLAYING DEVICE AND METHOD, AND IMAGE PROCESSING DEVICE AND METHOD

(75) Inventors: Kenichiroh Yamamoto, Osaka (JP); Hiroyuki Furukawa, Osaka (JP); Masafumi Ueno, Osaka (JP); Yasuhiro Yoshida, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 723 days.

(21) Appl. No.: 12/518,072

(22) PCT Filed: May 18, 2007

(86) PCT No.: PCT/JP2007/060194
§ 371 (c)(1),
(2), (4) Date: Jun. 5, 2009

(87) PCT Pub. No.: WO2008/078419
PCT Pub. Date: Jul. 3, 2008

(65) Prior Publication Data
US 2010/0321566 A1    Dec. 23, 2010

(30) Foreign Application Priority Data
Dec. 22, 2006   (JP) ................................. 2006-345632

(51) Int. Cl.
*H04N 7/01* (2006.01)
(52) U.S. Cl. .......................... 348/441; 348/443; 382/300
(58) Field of Classification Search .......... 348/441–443, 348/452, 554, 911; 382/300
See application file for complete search history.

(56) References Cited

U.S. PATENT DOCUMENTS 4,307,420 A    12/1981 Ninomiya et al.
4,695,882 A    9/1987   Wada et al.
(Continued)

FOREIGN PATENT DOCUMENTS

EP    2 077 664 A1    7/2009
(Continued)

OTHER PUBLICATIONS

Ishiguro et al., "Consideration on Motion Picture Quality of the Hold Type Display with an octuple-rate CRT", Technical Report of IEICE, Institute of Electronics, Information and Communication Engineers, EID96-4, Jun. 1996, pp. 19-26.

(Continued)

*Primary Examiner* — Annan Shang
(74) *Attorney, Agent, or Firm* — Birch, Stewart, Kolasch & Birch, LLP

(57) ABSTRACT

In an image displaying device provided with a frame rate conversion (FRC) portion, the image quality deterioration in a moving image likely to include a plurality of the same consecutive images due to a FRC processing is prevented. The FRC portion (100) of the image displaying device includes a motion vector detecting portion (101) that detects motion vector information from an input image signal, an interpolation frame generating portion (106) that generates interpolation frames based on the motion vector information obtained by the motion vector detecting portion (101) and a same image detecting portion (105) that detects a case where the same images continue in the input image signal. In the case where the image of the (n−1)-th frame in the input image signal is substantially the same as the image of the n-th frame, interpolation image generating processing with the motion compensation processing made ineffective is performed between n-th frame and (n+1)-th frame to prevent that the interpolation image including a lot of errors is output.

29 Claims, 25 Drawing Sheets

U.S. PATENT DOCUMENTS

| | | | |
|---|---|---|---|
| 5,365,280 A | 11/1994 | De Haan et al. | |
| 6,181,382 B1 * | 1/2001 | Kieu et al. | 348/459 |
| 6,469,744 B1 * | 10/2002 | Pearlstein | 348/554 |
| 6,549,240 B1 * | 4/2003 | Reitmeier | 348/459 |
| 6,930,728 B2 * | 8/2005 | Rhee | 348/448 |
| 7,375,763 B2 * | 5/2008 | Alfonso et al. | 348/448 |
| 7,843,509 B2 * | 11/2010 | Hahn et al. | 348/448 |
| 2004/0071313 A1 * | 4/2004 | Hahn et al. | 382/100 |
| 2004/0085480 A1 | 5/2004 | Salzer et al. | |
| 2005/0134735 A1 | 6/2005 | Swartz | |
| 2005/0243216 A1 | 11/2005 | Salzer et al. | |
| 2005/0243933 A1 | 11/2005 | Landsiedel et al. | |
| 2006/0092321 A1 * | 5/2006 | Ogino et al. | 348/441 |

FOREIGN PATENT DOCUMENTS

| | | |
|---|---|---|
| GB | 2 263 600 A | 7/1993 |
| JP | 55-162683 A | 12/1980 |
| JP | 55-162684 A | 12/1980 |
| JP | 60-158786 A | 8/1985 |
| JP | 62-206980 A | 9/1987 |
| JP | 4-302289 A | 10/1992 |
| JP | 06-098256 A | 4/1994 |
| JP | 06-217266 | 8/1994 |
| JP | 2000-259146 | 9/2000 |
| JP | 2004-120757 A | 4/2004 |
| JP | 2005-051460 A | 2/2005 |
| JP | 2005-167887 A | 6/2005 |
| JP | 2005-208613 A | 8/2005 |
| JP | 2005-301622 | 10/2005 |
| JP | 2005-318612 A | 11/2005 |
| JP | 2005-318622 A | 11/2005 |
| WO | WO 94/30006 A1 | 12/1994 |

OTHER PUBLICATIONS

Yamauchi, "TV Standards Conversion", Journal of the Institute of Television Engineers of Japan, vol. 45, No. 12, , 1991, pp. 1534-1543.

* cited by examiner

IMAGE DISPLAYING DEVICE AND METHOD, AND IMAGE PROCESSING DEVICE AND METHOD

TECHNICAL FIELD

The present invention relates to an image displaying device and method and an image processing device and method having a function of converting a frame rate or field rate, and more particularly, to an image displaying device and an image displaying method by the device and an image processing device and an image processing method by the device, which include preventing the image quality deterioration of a moving image likely to include a plurality of the same consecutive images due to a motion-compensated rate conversion processing.

BACKGROUND OF THE INVENTION

As compared to conventional cathode-ray tubes (CRTs) primarily used for realizing moving images, LCDs (Liquid Crystal Displays) have a drawback, so-called motion blur, which is the blurring of outline of a moving portion perceived by a viewer when displaying a moving image. It is pointed out that this motion blur arises from the LCD display mode itself (see, e.g., Specification of Japanese Patent No. 3295437; "Ishiguro Hidekazu and Kurita Taiichiro, "Consideration on Motion Picture Quality of the Hold Type Display with an octuple-rate CRT", IEICE Technical Report, Institute of Electronics, Information and Communication Engineers, EID96-4 (1996-06), p. 19-26").

Since fluorescent material is scanned by an electron beam to cause emission of light for display in CRTs, the light emission of pixels is basically impulse-like although slight afterglow of the fluorescent material exists. This is called an impulse display mode. On the other hand, in the case of LCDs, an electric charge is accumulated by applying an electric field to liquid crystal and is retained at a relatively high rate until the next time the electric field is applied. Especially, in the case of the TFT mode, since a TFT switch is provided for each dot composing a pixel and each pixel normally has an auxiliary capacity, the ability to retain the accumulated charge is extremely high. Therefore, the light emission is continued until the pixels are rewritten by the application of the electric field based on the image information of the next frame or field (hereinafter, represented by the frame). This is called a hold display mode.

Since the impulse response of the image displaying light has a temporal spread in the above hold display mode, spatial frequency characteristics deteriorate along with temporal frequency characteristics, resulting in the motion blur. Since the human eye can smoothly follow a moving object, if the light emission time is long as in the case of the hold type, the movement of image seems jerky and unnatural due to the time integration effect.

To improve the motion blur in the above hold display mode, a frame rate (number of frames) is converted by interpolating an image between frames in a known technology. This technology is called FRC (Frame Rate Converter) and is put to practical use in liquid crystal displaying devices, etc.

Conventionally known methods of converting the frame rate include various techniques such as simply repeating readout of the same frame for a plurality of times and frame interpolation using linear interpolation between frames (see, e.g., Yamauchi Tatsuro, "TV Standards Conversion", Journal of the Institute of Television Engineers of Japan, Vol. 45, No. 12, pp. 1534-1543 (1991)). However, in the case of the frame interpolation processing using the linear interpolation, unnaturalness of motion (jerkiness, judder) is generated due to the frame rate conversion, and the motion blur disturbance due to the above hold display mode cannot sufficiently be improved, resulting in inadequate image quality.

To eliminate effects of the jerkiness, etc., and improve quality of moving images, a motion compensation processing using motion vectors is proposed. Since a moving image itself is captured to compensate the image movement in this motion compensation processing, highly natural moving images may be acquired without deteriorating the resolution and generating the jerkiness. Since interpolation image signals are generated with motion compensation, the motion blur disturbance due to the above hold display mode may sufficiently be improved.

Above Specification of Japanese Patent No. 3295437 discloses a technology of motion-adaptively generating interpolation frames to increase a frame frequency of a display image for improving deterioration of spatial frequency characteristics causing the motion blur. In this case, at least one interpolation image signal interpolated between frames of a display image is motion-adaptively created from the previous and subsequent frames, and the created interpolation image signals are interpolated between the frames and are sequentially displayed.

FIG. 1 is a block diagram of a schematic configuration of an FRC drive display circuit in a conventional liquid crystal displaying device and, in FIG. 1, the FRC drive display circuit includes an FRC portion 100 that converts the number of frames of the input image signal by interpolating the image signals to which the motion compensation processing has been given between frames of the input video signal, an active-matrix liquid crystal display panel 104 having a liquid crystal layer and an electrode for applying the scan signal and the data signal to the liquid crystal layer, and an electrode driving portion 103 for driving a scan electrode and a data electrode of the liquid crystal display panel 104 based on the image signal subjected to the frame rate conversion by the FRC portion 100.

The FRC portion 100 includes a motion vector detecting portion 101 that detects motion vector information from the input image signal and an interpolation frame generating portion 102 that generates interpolation frames based on the motion vector information acquired by the motion vector detecting portion 101.

In the above configuration, for example, the motion vector detecting portion 101 may obtain the motion vector information with the use of a block matching method and a gradient method described later or if the motion vector information is included in the input image signal in some form, this information may be utilized. For example, the image data compression-encoded with the use of the MPEG format includes motion vector information of a moving image calculated at the time of encoding, and this motion vector information may be acquired.

FIG. 2 is a diagram for explaining a frame rate conversion processing by the conventional FRC drive display circuit shown in FIG. 1. The FRC portion 100 generates interpolation frames (gray-colored images in FIG. 2) between frames with the motion compensation using the motion vector information output from the motion vector detecting portion 101 and sequentially outputs the generated interpolation signals along with the input frame signals to perform processing of converting the frame rate of the input image signal from 60 frames per second (60 Hz) to 120 frames per second (120 Hz).

FIG. 3 is a diagram for explaining an interpolation frame generation processing of the motion vector detecting portion 101 and the interpolation frame generating portion 102. The motion vector detecting portion 101 uses the gradient method to detect a motion vector 111 from, for example, a frame #1 and a frame #2 shown in FIG. 2. The motion vector detecting portion 101 obtains the motion vector 111 by measuring a direction and an amount of movement in 1/60 of a second between the frame #1 and the frame #2. The interpolation frame generating portion 102 then uses the obtained motion vector 111 to allocate an interpolation vector 112 between the frame #1 and the frame #2. An interpolation frame 113 is generated by moving an object (in this case, an automobile) from a position of the frame #1 to a position after 1/120 of a second based on the interpolation vector 112.

By performing the motion-compensated frame interpolation processing with the use of the motion vector information to increase a display frame frequency in this way, the display state of the LCD (the hold display mode) can be made closer to the display state of the CRT (the impulse display mode) and the image quality deterioration can be improved which is due to the motion blur generated when displaying a moving image.

In the motion-compensated frame interpolation processing, it is essential to detect the motion vectors for performing the motion compensation. Proposed as the motion vector detecting method are, for example, the pattern matching methods described in "a method for detecting motion in a television image" of Japanese Laid-Open Patent Publication No. 55-162683 and "a method for asymptotically detecting an image motion vector" of Japanese Laid-Open Patent Publication No. 55-162684, or the iterative gradient methods described in "an image movement amount detecting mode" of Japanese Laid-Open Patent Publication No. 60-158786 or "an initial deflection mode in estimating motion of a moving image" of Japanese Laid-Open Patent Publication No. 62-206980.

Especially, the motion vector detecting mode according to the latter iterative gradient method is smaller and may detect the motion vectors more accurately compared to the pattern matching method. That is, in the motion vector detecting method according to the iterative gradient method, each frame of digitalized television signals is divided into blocks of a previously given size, for example, with m by n pixels including m pixels in the horizontal direction and n lines in the vertical direction and the calculations of the iterative gradient method are applied for each block based on the signal gradient in the screen and a physical reaction of a signal differential value between corresponding screens to estimate a movement amount.

Meanwhile, a moving image has a high correlation between frames and continuity in time scale. A pixel or block moving in a certain frame also moves with a similar movement amount in the subsequent frames or previous frames in many cases. For example, in the case of a moving image in which a ball rolling from right to left in the screen is shot, an area of the ball moves with the similar movement amount in any of the frames. That is, a motion vector often has continuity between consecutive frames.

Therefore, by referring to a result of the motion vector detection in the previous frame, the motion vector detection in the subsequent frame may be performed more easily or more accurately. The Japanese Laid-Open Patent Publication No. 62-206980 proposes a method that as an initial value for estimating a movement amount, from the motion vector candidates that have been already detected in a plurality of surrounding blocks including a block corresponding to the detected block, an optimum one for the motion vector detection in the detected block is selected as an initial displacement vector and the calculation of the gradient method is started from the value close to a true motion vector in the detected block so that the number of the calculations of the gradient method is reduced to detect the true motion vector, for example, by performing the calculation of the gradient method twice.

FIG. 4 shows an example of a motion vector detecting portion that performs vector detection with reference to a result of the motion vector detection in the previous frame. This explains an example of an internal configuration of the motion vector detecting portion 101 included in the FRC portion 100 of the image displaying device shown in FIG. 1 in detail. The vector detecting portion 101 has a frame delaying portion 1, an initial displacement vector selecting portion 2, a motion vector calculating portion 3, a vector memory 4 and a zero-vector holding portion 5, and acquires, for each of the detected blocks, a motion vector that represents a direction and a size of the motion between corresponding blocks, for example, of an input image signal of the immediately previous frame that has been delayed by the frame delaying portion 1 and an input image signal of the current frame.

The initial displacement vector selecting portion 2 selects an optimum motion vector as an initial displacement vector in the detected block by using a candidate vector group selected from motion vectors that have been already detected and accumulated in the vector memory 4 and a length-zero-vector (hereinafter referred to as zero-vector) supplied from the zero-vector holding portion 5. The motion vector calculating portion 3 uses the selected initial displacement vector as a starting point to acquire the true motion vector in the detected block, for example, by performing the calculation of the iterative gradient method twice.

Furthermore, the true motion vector calculated by the motion vector calculating portion 3 is stored in the vector memory 4 and is used as a candidate of the initial displacement vector for the motion detection processing in the next frame. When a moving object moves through and a background appears in a certain area of the screen, the movement amount changes rapidly from a certain level to zero, but this change may also be followed by adding zero-vector to the candidates of the initial displacement vector. This method is disclosed, for example, in Japanese Laid-Open Patent Publication No. 2005-301622.

Furthermore, Japanese Laid-Open Patent Publication No. 06-217266 discloses "a motion vector detection circuit" in which a method for detecting an initial displacement vector of motion between blocks of image signals that are away from at least one or more field or frame each other is proposed to further improve accuracy of the motion vector detection. Also in the block matching method, efficient motion vector detection is thought to be performed by changing a search order with reference to the result of the motion vector detection in the previous frame. In this way, by using the already-detected motion vector for detecting the motion vector, for example, a real time processing of the frame rate conversion is possible.

DISCLOSURE OF THE INVENTION

Problems to be Solved by the Invention

In the mean time, for example, a normal movie film has 24 frames per second and, when this film is output to a display having a frame rate of 60 Hz, the 2-3 pull-down processing is given to a video having a frame rate of 24 Hz and the video is converted into video signals having a frame rate of 60 Hz by outputting the same images for every two or three frames to be output.

When a film movie or a CG animation video having 30 frames per second is output to a display having a frame rate of 60 Hz, the video having a frame rate of 30 Hz is subjected to the 2-2 pull-down processing and is converted into and output as video signals having a frame rate of 60 Hz by outputting the same images for every two frames. When a film movie having 24 frames per second is output to a display having a frame rate of 50 Hz, the 2-2 pull-down processing is given to a video having a frame rate of 24 Hz and the same images are output for every two frames.

Film movies or CG animation videos often have original images having a frame rate equal to 60 Hz or less, or equal to 50 Hz or less, and are displayed and output as 60-Hz or 50-Hz video signals by consecutively outputting a plurality of the same images as above.

Furthermore, also when a video image is reproduced slowly, a reproduction speed is lowered by outputting a plurality of pieces of the same images. For example, the slow reproduction at 50% of reproduction speed is performed by outputting a frame of the original video image by two pieces at a time and the slow reproduction at about 67% of reproduction speed is performed by repeating the procedure of outputting two pieces of a frame and one piece of the next frame of the original video image.

Among the examples above, description will be given for the case of the cinema video image to which a 2-3 pull down processing has been given with the use of FIG. 5. Frames #1 to #10 in FIG. 5 represent an image sequence where the cinema video image of 24 Hz is converted into 60 Hz by the 2-3 pull down processing. The frames #1 and #2, the frames #3 to #5, the frames #6 and #7, and the frames #8 to #10 are the same images, respectively.

In a video likely to include a plurality of the same output images, the continuity of motion vectors becomes impaired between frames. For example, it is assumed that some kind of a moving object is shot in the video of FIG. 5. Although a motion vector is detected between the frames #5 and #6 since these frames are different images, a motion vector to be detected should completely be zero between the next frames #6 and #7 since these frames are the same images. Since the next frames #7 and #8 are different images, a motion vector is detected between these frames.

With regard to the motion vectors of the successive frames from the frame #5 to the frame #7 of FIG. 5, no continuity of the motion vectors exists between adjacent frames since "motion vector exists", "motion vector is zero", and "motion vector exists" are mixed in this order.

If the processing for detecting the motion vector in the next frame is executed by referring to the motion vector detection result of the previous frame as above for such a video likely to include a plurality of the same output images, it is problematic that the motion vector is erroneously detected since no continuity of the motion vector exists between the frames.

The errors easily occur, in particular, when the result of the motion vector detection in the previous frame is zero-vector and the motion is present in the next frame. In addition, when the vector detection errors occur in a certain frame, the vector detection in the further next frame is also affected. In some cases, the processing is needed for several frames beginning from a discontinuous point of the motion vector until the vector detection is stably performed.

In contrast, when some motion vectors are present in the result of the motion vector detection in the previous frame and the motion is not present in the next frame, zero-vector is accurately detected in many cases. As described above, this is because zero-vector is easily detected by adding zero-vector to the candidates of the initial displacement vector.

According to the example above, since the frames #7 and #8 in FIG. 5 are different images, the motion vector is to be detected therebetween, but the motion vector between the previous frames #6 and #7 is zero-vector, and therefore, reference thereto causes a possibility that zero-vector is erroneously detected or an accurate vector is not detected. Such vector detection errors deteriorate the image quality of an interpolation image.

The present invention was conceived to solve the above-mentioned problems, and the object thereof is to prevent the image quality deterioration due to errors of the motion compensation frame rate conversion (FRC) processing in a moving image in which a plurality of pieces of the same images may continue.

Means for Solving the Problems

A first invention of the present application is an image displaying device having a rate converting portion that interpolates an interpolation image signal between frames or fields of an input image signal to convert the number of frames or fields of the input image signal, wherein the image displaying device includes a detecting portion that detects, when a correlation between an (n−1)th (n is an arbitrary natural number) frame or field and an n-th frame or field of the input image signal is larger than a predetermined amount, the two frames or fields as the same images, the rate converting portion includes an interpolation image generating portion that applies a motion compensation processing to the input image signal to generate an interpolation image signal based on motion vector information between frames or fields of the input image signal, and interpolation of the image signal generated by applying the motion compensation processing is not performed at least between the n-th frame or field and an (n+1)th frame or field when the two frames or fields are detected as the same images by the detecting portion.

A second invention of the present application is the image displaying device, wherein when the (n−1)th frame or field and the n-th frame or field are detected as the same images by the detecting portion, the rate converting portion interpolates, between frames or fields of the input image signal, an image signal generated by making the motion compensation processing in the interpolation image generating portion ineffective at least between the n-th frame or field and the (n+1)th frame or field.

A third invention of the present application is the image displaying device, wherein the interpolation image generating portion includes a motion vector detecting portion that detects motion vector information between consecutive frames or fields included in the input image signal and an interpolation vector allocating portion that allocates an interpolation vector between the frames or the fields based on the motion vector information detected by the detecting portion.

A fourth invention of the present application is the image displaying device, wherein when the (n−1)th frame or field and the n-th frame or field are detected as the same images by the detecting portion, the interpolation image generating portion sets a motion vector detected at least between the n-th frame or field and the (n+1)th frame or field to zero-vector to make the motion compensation processing ineffective.

A fifth invention of the present application is the image displaying device, wherein when the (n−1)th frame or field and the n-th frame or field are detected as the same images by the detecting portion, the interpolation image generating portion sets an interpolation vector allocated between the n-th frame or field and the (n+1)th frame or field to zero-vector to make the motion compensation processing ineffective based on the motion vector detected at least between the n-th frame or field and the (n+1)th frame or field.

A sixth invention of the present application is the image displaying device, wherein when the (n−1)th frame or field and the n-th frame or field are detected as the same images by the detecting portion, the rate converting portion inserts, between frames or fields of the input image signal, an image signal of the n-th frame or field to convert the number of frames or fields of the input image signal at least between the n-th frame or field and the (n+1)th frame or field.

A seventh invention of the present application is the image displaying device, wherein when the (n−1)th frame or field and the n-th frame or field are detected as the same images by the detecting portion, the rate converting portion inserts, between frames or fields of the input image signal, an image signal of the (n+1)th frame or field to convert the number of frames or fields of the input image signal at least between the n-th frame or field and the (n+1)th frame or field.

An eighth invention of the present application is the image displaying device, wherein when the (n−1)th frame or field and the n-th frame or field are detected as the same images by the detecting portion, the rate converting portion inserts, between frames or fields of the input image signal, a linear interpolation image signal between the n-th frame or field and the (n+1)th frame or field into to convert the number of frames or fields of the input image signal at least between the n-th frame or field and the (n+1)th frame or field.

A ninth invention of the present application is the image displaying device, wherein when the (n−1)th frame or field and the n-th frame or field are detected as the same images by the detecting portion, the rate converting portion inserts, between frames or fields of the input image signal, a predetermined monochromatic image signal to convert the number of frames or fields of the input image signal for at least between the n-th frame or field and the (n+1)th frame or field.

A tenth invention of the present application is the image displaying device, wherein when the (n−1)th frame or field and the n-th frame or field are detected as the same images by the detecting portion, the rate converting portion does not perform interpolation of the image signal generated by applying the motion compensation processing for a period from the n-th frame or field to an (n+N+1)th (N is a predetermined natural number) frame or field.

An eleventh invention of the present application is the image displaying device, wherein when the (n−1)th frame or field and the n-th frame or field are detected as the same images, the detecting portion reduces a threshold for same image detection for the n-th frame or field and the (n+1)th frame or field.

A twelfth invention of the present application is the image displaying device, wherein the detecting portion obtains a sum of absolute values of differences of pixels in the (n−1)th frame or field and pixels in the n-th frame or field, and detects the two frames or fields as the same images when the sum of absolute values of differences is smaller than a predetermined threshold.

A thirteenth invention of the present application is the image displaying device, wherein the detecting portion counts the number of pixels in which a difference between pixels in the (n−1)th frame or field and pixels in the n-th frame or field exists at a predetermined threshold or more, and detects the two frames or fields as the same images when the counted value is smaller than another predetermined threshold.

A fourteenth invention of the present application is the image displaying device, wherein the detecting portion counts the number of vectors in which a length of a motion vector detected between the (n−1)th frame or field and the n-th frame or field is equal to or smaller than a predetermined threshold, and detects the two frames or fields as the same images when the counted value is larger than the predetermined threshold.

A fifteenth invention of the present application is the image displaying device, wherein one or a plurality of detecting portion as defined in any one of twelfth to fourteenth invention is included.

A sixteenth invention of the present application is an image displaying method having a rate converting step of interpolating an interpolation image signal between frames or fields of an input image signal to convert the number of frames or fields of the input image signal, wherein the step of detecting, when a correlation between an (n−1)th (n is an arbitrary natural number) frame or field and an n-th frame or field of the input image signal is larger than a predetermined amount, the two frames or fields as the same images is included, the rate converting step includes an interpolation image generating step of applying a motion compensation processing to the input image signal to generate an interpolation image signal based on motion vector information between frames or fields of the input image signal, and interpolation of the image signal generated by applying the motion compensation processing is not performed at least between the n-th frame or field and an (n+1)th frame or field when the two frames or fields are detected as the same images.

A seventeenth invention of the present application is the image displaying method, wherein the rate converting step interpolates, between frames or fields of the input image signal, an image signal generated by making the motion compensation processing in the interpolation image generating step ineffective at least between the n-th frame or field and the (n+1)th frame or field when the two frames or fields are detected as the same images.

An eighteenth invention of the present application is an image processing device having a rate converting portion that interpolates an interpolation image signal between frames or fields of an input image signal to convert the number of frames or fields of the input image signal, wherein the image processing device includes a detecting portion that detects, when a correlation between an (n−1)th (n is an arbitrary natural number) frame or field and an n-th frame or field of the input image signal is larger than a predetermined amount, the two frames or fields as the same images, the rate converting portion includes an interpolation image generating portion that applies a motion compensation processing to the input image signal to generate an interpolation image signal based on motion vector information between frames or fields of the input image signal, and interpolation of the image signal generated by applying the motion compensation processing is not performed at least between the n-th frame or field and an (n+1)th frame or field when the two frames or fields are detected as the same images by the detecting portion.

A nineteenth invention of the present application is the image processing device, wherein the rate converting portion interpolates, between frames or fields of the input image signal, an image signal generated by making the motion compensation processing in the interpolation image generating portion ineffective at least between the n-th frame or field and the (n+1)th frame or field when the (n−1)th frame or field and the n-th frame or field are detected as the same images by the detecting portion.

A twentieth invention of the present application is an image processing method having a rate converting step of interpolating an interpolation image signal between frames or fields of an input image signal to convert the number of frames or fields of the input image signal, wherein the step of detecting, when a correlation between an (n−1)th (n is an arbitrary natural number) frame or field and an n-th frame or field of the input image signal is larger than a predetermined amount, the two frames or fields as the same images is included, the rate converting step includes an interpolation image generating step of applying a motion compensation processing to the input image signal to generate an interpolation image signal based on motion vector information between frames or fields of the input image signal, and interpolation of the image signal generated by applying the motion compensation processing is not performed at least between the n-th frame or field and an (n+1)th frame or field when the two frames or fields are detected as the same images.

A twenty-first invention of the present application is the image processing method, wherein the rate converting step interpolates, between frames or fields of the input image signal, an image signal generated by making the motion compensation processing in the interpolation image generating step ineffective at least between the n-th frame or field and the (n+1)th frame or field when the two frames or fields are detected as the same images.

A twenty-second invention of the present application is an image displaying device having a rate converting portion that interpolates an interpolation image signal between frames or fields of an input image signal to convert the number of frames or fields of the input image signal, wherein the image displaying device includes a detecting portion that detects, when a correlation between an (n−1)th (n is an arbitrary natural number) frame or field and an n-th frame or field of the input image signal is larger than a predetermined amount, the two frames or fields as the same images, the rate converting portion includes an interpolation image generating portion that applies a motion compensation processing to the input image signal to generate an interpolation image signal based on motion vector information between frames or fields of the input image signal, and an interpolation image signal generated by reducing the compensation intensity of the motion compensation processing is interpolated between frames or fields of the input image signal for at least between the n-th frame or field and an (n+1)th frame or field when the two frames or fields are detected as the same images by the detecting portion.

A twenty-third invention of the present application is the image displaying device, wherein the interpolation image generating portion performs weighted addition of the image signal to which the motion compensation processing has been given and an image signal to which the motion compensation processing has not been given at a predetermined rate to generate an interpolation image signal and the weighted addition ratio of the image signal to which the motion compensation processing has been given is reduced at least between the n-th frame or field and the (n+1)th frame or field when the (n−1)th frame or field and the n-th frame or field are detected as the same images by the detecting portion.

A twenty-fourth invention of the present application is the image displaying device, wherein the interpolation image generating portion defines the image signal to which the motion compensation processing has not been given as the interpolation image signal at least between the n-th frame or field and the (n+1)th frame or field when the (n−1)th frame or field and the n-th frame or field are detected as the same images and the interpolation image generating portion defines the image signal to which the motion compensation processing has been given as the interpolation image signal between the n-th frame or field and the (n+1)th frame or field when the (n−1)th frame or field and the n-th frame or field are not detected as the same images.

A twenty-fifth invention of the present application is the image displaying device, wherein when the (n−1)th frame or field and the n-th frame or field are detected as the same images by the detecting portion, the compensation intensity of the motion compensation processing between frames or fields of the input image signal is reduced for a period from the n-th frame or field to an (n+N+1)th (N is a predetermined natural number) frame or field.

A twenty-sixth invention of the present application is the image displaying device, wherein when the (n−1)th frame or field and the n-th frame or field are detected as the same images, the detecting portion reduces a threshold for same image detection for the n-th frame or field and the (n+1)th frame or field.

A twenty-seventh invention of the present application is an image displaying method having a rate converting step of interpolating an interpolation image signal between frames or fields of an input image signal to convert the number of frames or fields of the input image signal, wherein the step of detecting, when a correlation between an (n−1)th (n is an arbitrary natural number) frame or field and an n-th frame or field of the input image signal is larger than a predetermined amount, the two frames or fields as the same images is included, the rate converting step includes an interpolation image generating step of applying a motion compensation processing to the input image signal to generate an interpolation image signal based on motion vector information between frames or fields of the input image signal, and an interpolation image signal generated by reducing the compensation intensity of the motion compensation processing is interpolated between frames or fields of the input image signal for at least between the n-th frame or field and an (n+1)th frame or field when the two frames or fields are detected as the same images.

A twenty-eighth invention of the present application is an image processing device having a rate converting portion that interpolates an interpolation image signal between frames or fields of an input image signal to convert the number of frames or fields of the input image signal, wherein the image processing device includes a detecting portion that detects, when a correlation between an (n−1)th (n is an arbitrary natural number) frame or field and an n-th frame or field of the input image signal is larger than a predetermined amount, the two frames or fields as the same images, the rate converting portion includes an interpolation image generating portion that applies a motion compensation processing to the input image signal to generate an interpolation image signal based on motion vector information between frames or fields of the input image signal, and an interpolation image signal generated by reducing the compensation intensity of the motion compensation processing is interpolated between frames or fields of the input image signal for at least between the n-th frame or field and an (n+1)th frame or field when the two frames or fields are detected as the same images by the detecting portion.

A twenty-ninth invention of the present application is an image processing method having a rate converting step of interpolating an interpolation image signal between frames or fields of an input image signal to convert the number of frames or fields of the input image signal, wherein the step of detecting, when a correlation between an (n−1)th (n is an arbitrary natural number) frame or field and an n-th frame or field of the input image signal is larger than a predetermined amount, the two frames or fields as the same images is included, the rate converting step includes an interpolation image generating step of applying a motion compensation processing to the input image signal to generate an interpolation image signal based on motion vector information between frames or fields of the input image signal, and an interpolation image signal generated by reducing the compensation intensity of the motion compensation processing is interpolated between frames or fields of the input image signal for at least between the n-th frame or field and an (n+1)th frame or field when the two frames or fields are detected as the same images.

Effects of the Invention

According to the present invention, when an (n−1)th (n is an arbitrary natural number) frame or field and an n-th frame or field of an input image signal are detected as the same images, the image quality deterioration of a display image may effectively be prevented by not performing a motion compensation processing at least between the n-th frame or field and the (n+1)th frame or field.

EXPLANATION OF REFERENCE NUMERALS

Figure 1:
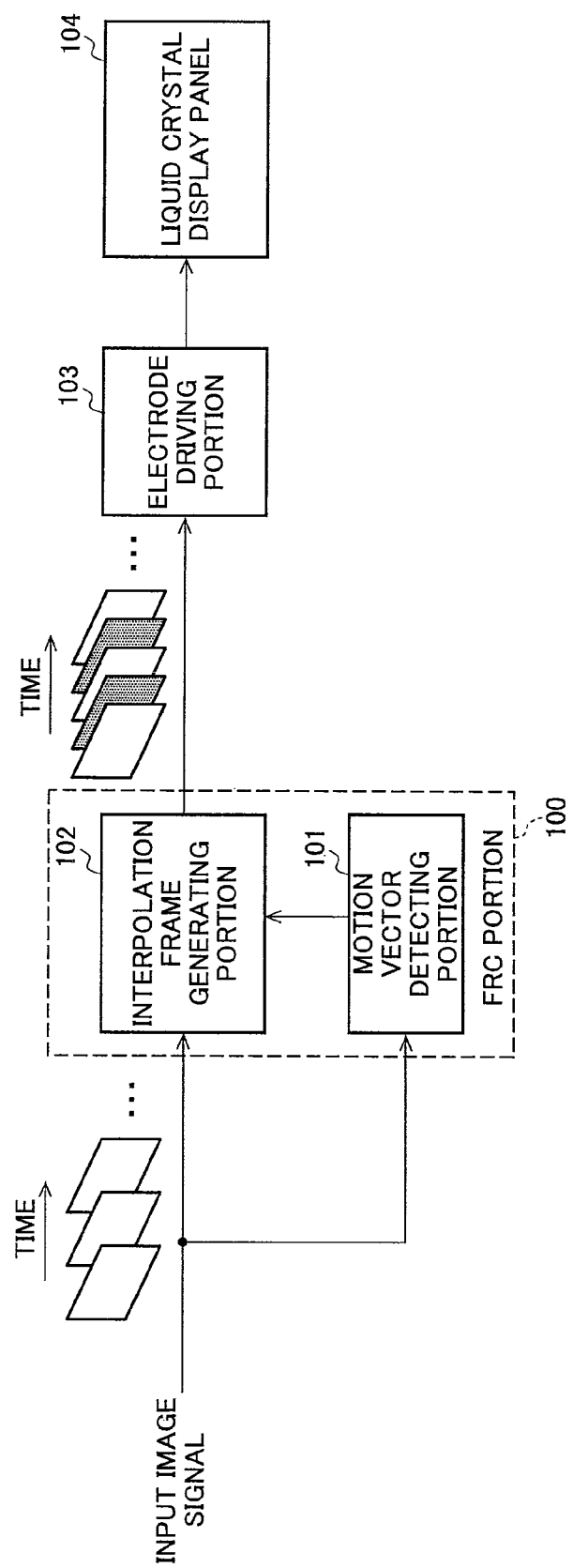
FIG. 1 is a block diagram of a schematic configuration of an FRC drive display circuit in a conventional liquid crystal displaying device.
Figure 2:
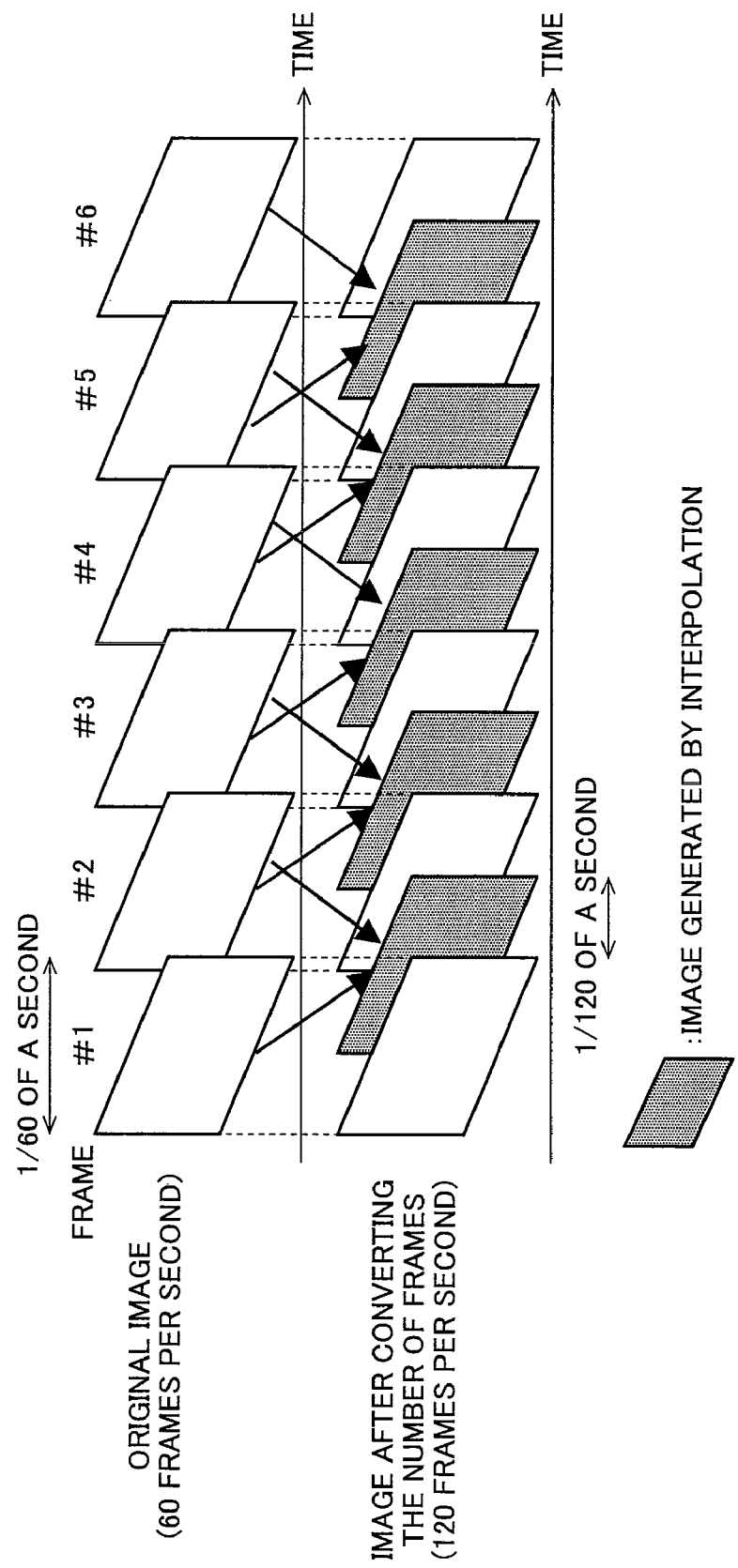
FIG. 2 is an explanatory diagram for explaining a frame rate conversion processing by the conventional FRC drive display circuit.
Figure 3:
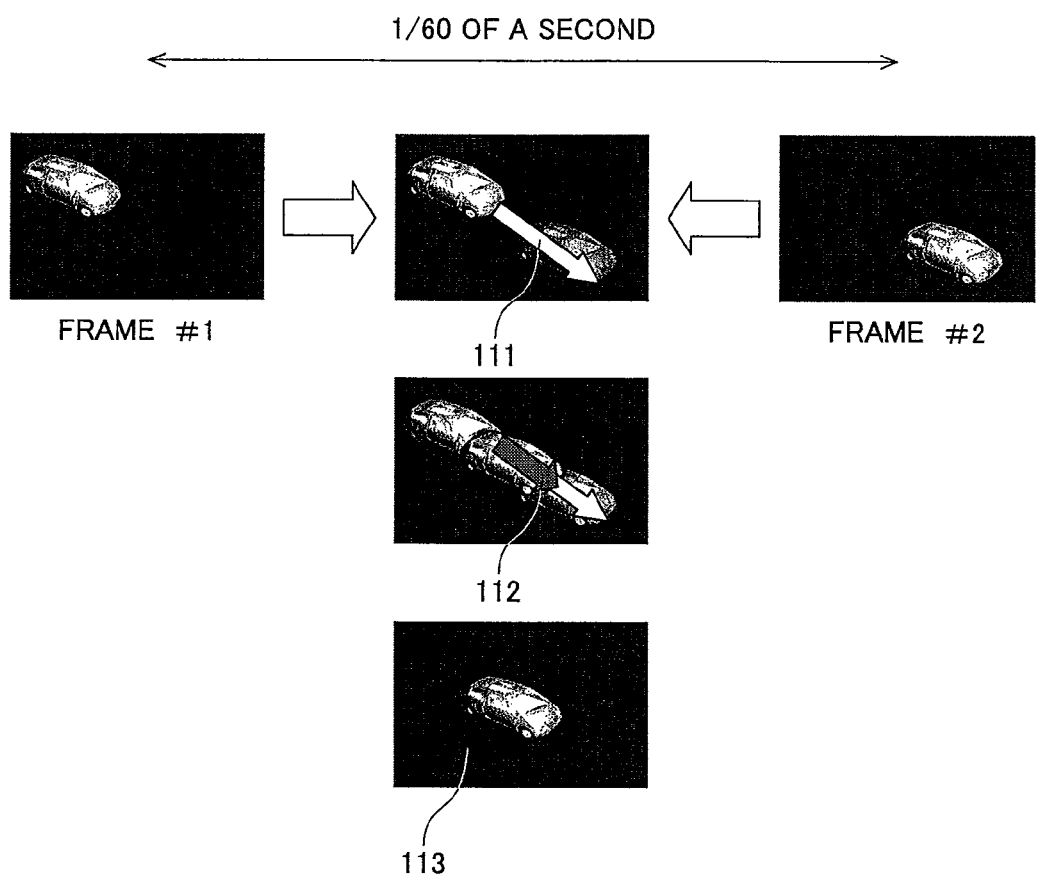
FIG. 3 is a diagram for explaining an interpolation frame generating processing of a motion vector detecting portion and an interpolation frame generating portion in the conventional FRC drive display circuit.
Figure 4:
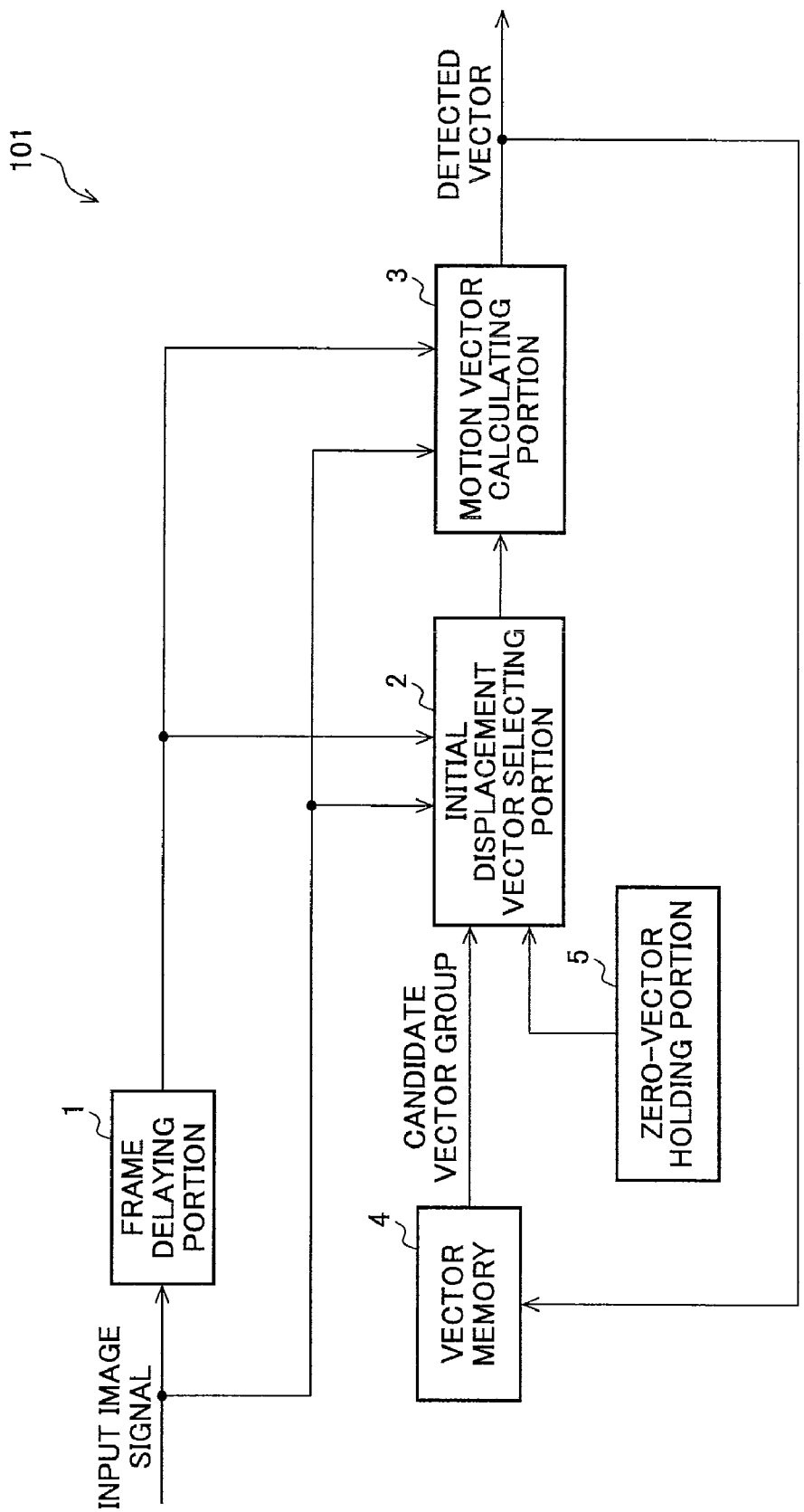
FIG. 4 is a block diagram of an exemplary configuration of the motion vector detecting portion that performs vector detection with reference to a result of motion vector detection in a previous frame in the conventional FRC drive display circuit.
Figure 5:
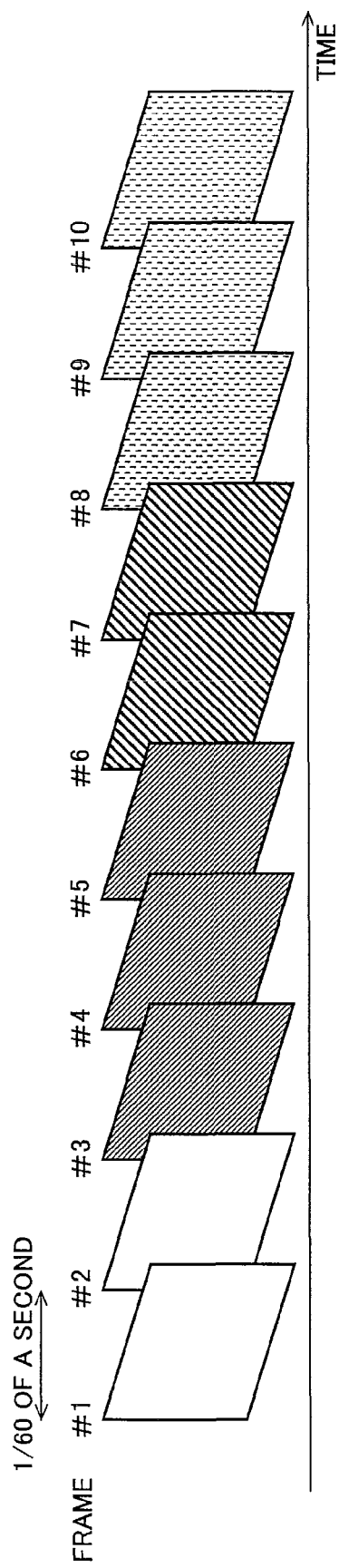
FIG. 5 is an explanatory diagram of frames of a cinema video image subjected to 2-3 pull down.

1 . . . frame delaying portion; 2 . . . initial displacement vector selecting portion; 3 . . . motion vector calculating portion; 4 . . . vector memory; 5 . . . zero-vector holding portion; 11 . . . frame delaying portion; 12 . . . pixel difference accumulating portion; 13 . . . same image determining portion; 14 . . . threshold A holding portion; 15 . . . difference present pixel number accumulating portion; 16 . . . same image determining portion; 17 . . . threshold B holding portion; 18 . . . threshold C holding portion; 19 . . . vector accumulating portion; 20 . . . same image determining portion; 21 . . . threshold D holding portion; 22 . . . threshold E holding portion; 51 . . . frame delaying portion; 52 . . . switching portion; 53 . . . zero-vector; 54 . . . interpolation vector evaluating portion; 55 . . . interpolation frame generating portion; 56 . . . time base converting portion; 57 . . . linear interpolation image generating portion; 58 . . . image mixing portion; 59 . . . black-level signal generating portion; 100 . . . frame rate converting (FRC) portion; 101 . . . motion vector detecting portion; 102 . . . interpolation frame generating portion; 103 . . . electrode driving portion; 104 . . . liquid crystal display panel; 105 . . . same image detecting portion; 106 . . . interpolation frame generating portion; 107 . . . same image detecting portion; 111 . . . motion vector; 112 . . . interpolation vector; and 113 . . . interpolation frame.

PREFERRED EMBODIMENTS OF THE INVENTION

A preferred embodiment of an image displaying device of the present invention will now be described referring to the accompanying drawings, but if any part is same as in the conventional example, same reference numeral is given thereto, with repeated description omitted. Although the present invention is applicable to field signals and interpolation field signals and to frame signals and interpolation frame signals, the frame signals and the interpolation frame signals will be described as a representative example since both (field and frame) are in a similar relationship with each other.

Figure 6:
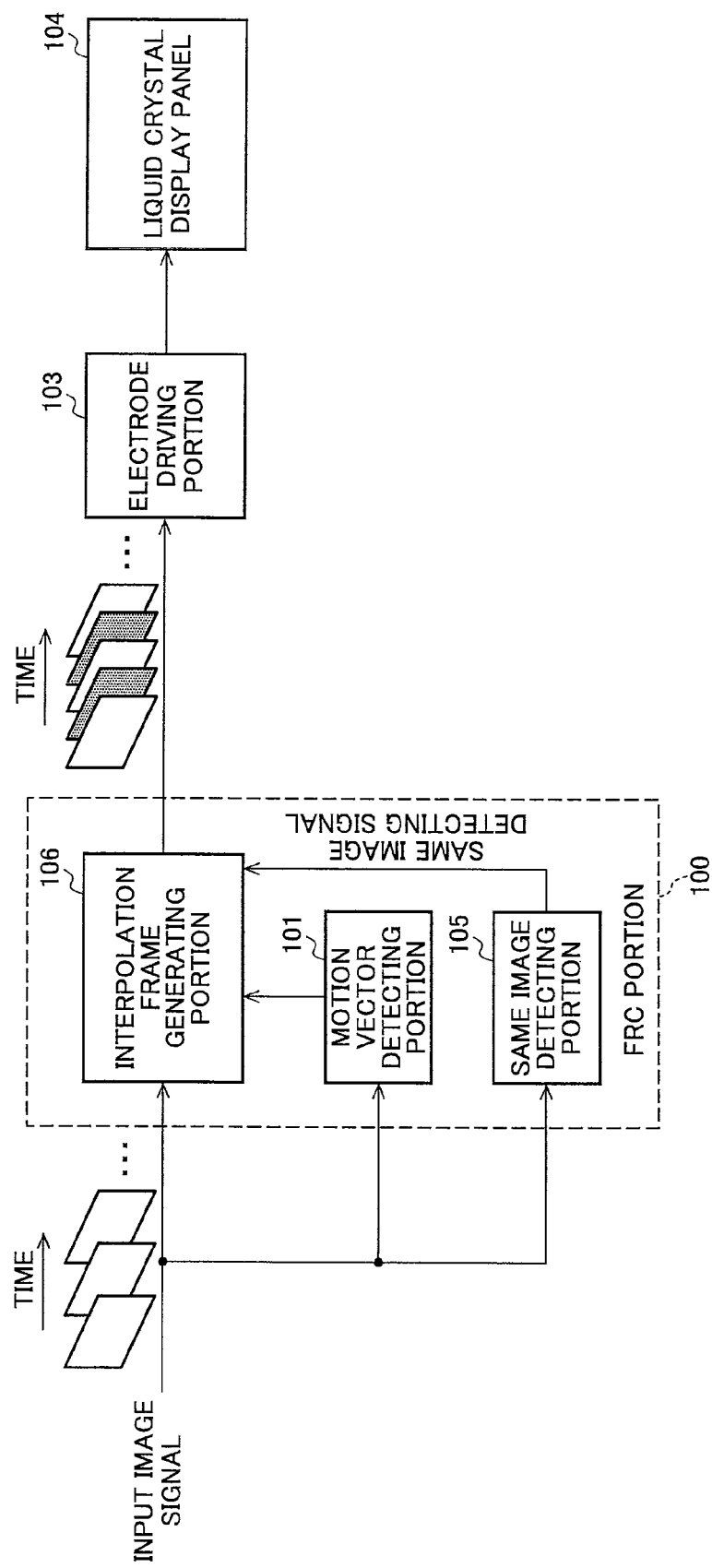
FIG. 6 is a block diagram of an example of a schematic configuration of an FRC drive display circuit in an embodiment of an image displaying device of the present invention.

FIG. 6 is a block diagram of an example of a schematic configuration of an FRC drive display circuit in the present invention and, in FIG. 6, the FRC drive display circuit includes an FRC portion 100 that converts the number of frames of the input image signal by interpolating the image signals to which the motion compensation processing has been given between frames of the input image signal, an active-matrix liquid crystal display panel 104 having a liquid crystal layer and an electrode for applying scan signals and data signals to the liquid crystal layer, and an electrode driving portion 103 for driving the scan electrodes and the data electrodes of the liquid crystal display panel 104 based on the image signal subjected to the frame rate conversion by the FRC portion 100.

The FRC portion 100 includes a motion vector detecting portion 101 that detects motion vector information from the input image signal, an interpolation frame generating portion 106 that generates an interpolation frame based on the motion vector information acquired by the motion vector detecting portion 101, and a same image detecting portion 105 that detects a case where the same images continue in the input image signal.

Differences in the configuration from the conventional example shown in FIG. 1 are that the same image detecting portion 105 that detects that the same images continue is added and the input image signal is input to the same image detecting portion 105, and that the processing of the interpolation frame generating portion 106 is variably controlled based on a detection result from the same image detecting portion 105.

The same image detecting portion 105 defines the input image signal as input, and when a correlation between two consecutive frames is larger than a predetermined amount, detects the two frames as the same images. When the two consecutive frames are detected as the same images, a same image detecting signal is output to the interpolation frame generating portion 106.

The interpolation frame generating portion 106 performs the processing to prevent the image quality deterioration when the same image detecting signal is received. The internal configuration and the processing of the same image detecting portion 105 will now be described and the processing to prevent the image quality deterioration in the interpolation frame generating portion 106 will be described in detail below.

Figure 7:
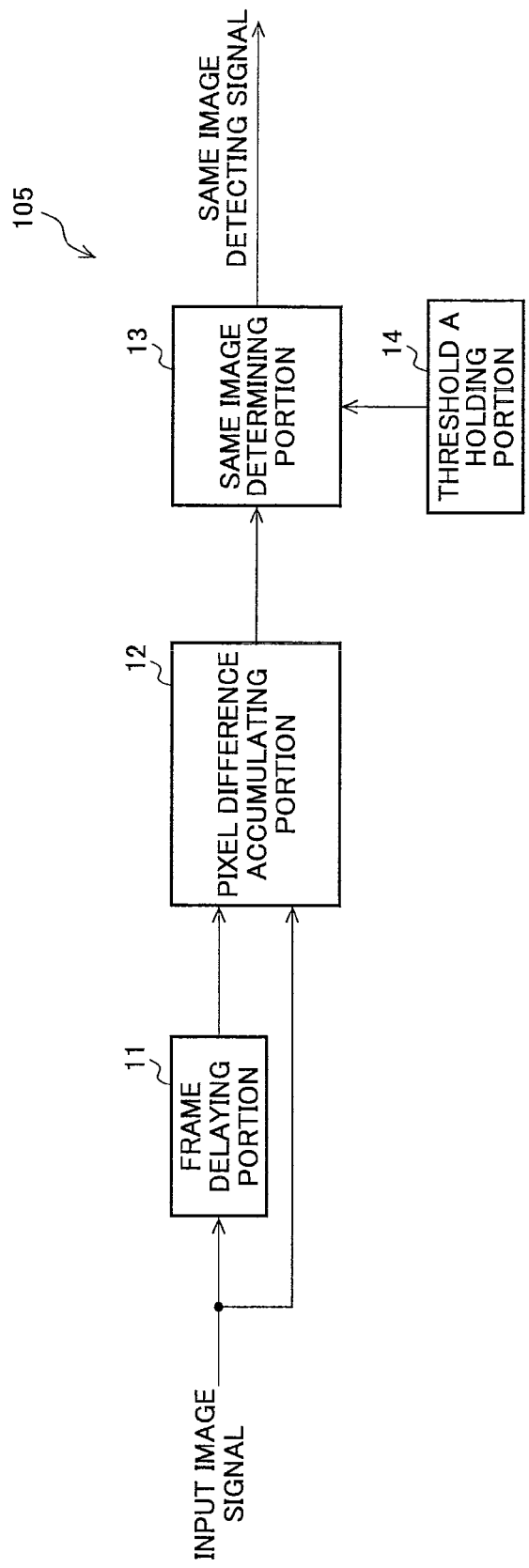
FIG. 7 is a block diagram of an example of a configuration of a same image detecting portion in an embodiment of the image displaying device of the present invention.

FIG. 7 is a block diagram of an example of a configuration of the same image detecting portion 105, and the same image detecting portion 105 of this example includes a frame delaying portion 11, a pixel difference accumulating portion 12, a same image determining portion 13, and a threshold A holding portion 14. The frame delaying portion 11 delays the input image signal for one frame period, for example, and the pixel difference accumulating portion 12 acquires a sum of absolute values of differences of pixels between the input image signal of the immediately previous frame delayed by the frame delaying portion 11 and the input image signal of the current frame.

When the sum of absolute values of differences acquired by the pixel difference accumulating portion 12 is smaller than the predetermined threshold A, the same image determining portion 13 detects the previous frame and the current frame as the same images and outputs the same image detecting signal. The threshold A holding portion 14 holds the predetermined threshold A that is used for the determination processing of the same image determining portion 13.

When the input image signal of the immediately previous frame and the input image signal of the current frame are completely the same, the difference of each pixel is zero and the sum of absolute values of differences is also zero. However, actually, a slight difference may occur in the images that are supposed to be completely the same due to noise by MPEG compression, etc., and therefore, a certain degree of permissible range is set for the same image determination by setting the predetermined threshold A.

For example, in a case where the resolution of an input image is a Full-HD size (1920 pixels by 1080 pixels) with an 8-bit monochromatic tone, when a pixel value one of noise is permitted on average in each pixel of consecutive frame images, 1920×1080×1=2073600 is set for the threshold A, and when the sum of absolute values of differences is equal to or lower than 2073600, the consecutive frame images are detected as the same images.

Figure 8:
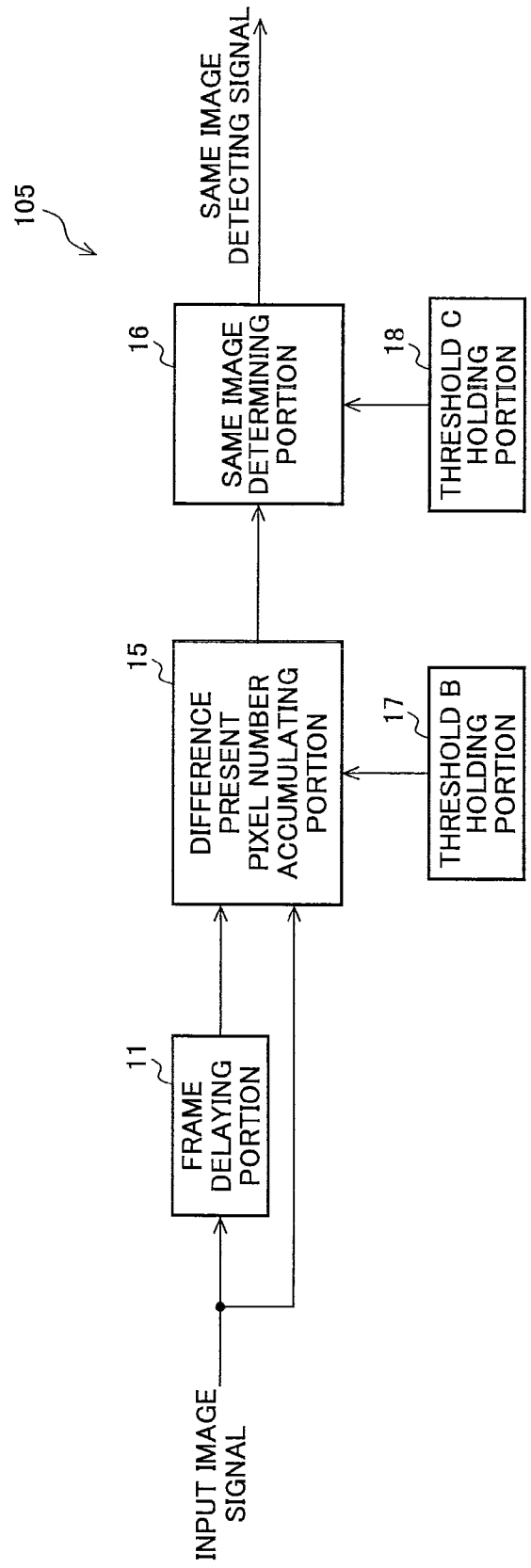
FIG. 8 is a block diagram of another example of a configuration of the same image detecting portion in an embodiment of the image displaying device of the present invention.

FIG. 8 is a block diagram of another example of a configuration of the same image detecting portion 105, and the same image detecting portion 105 of this example includes the frame delaying portion 11, a difference present pixel number accumulating portion 15, a same image determining portion 16, a threshold B holding portion 17, and a threshold C holding portion 18. The frame delaying portion 11 delays the input image signal for one frame period, for example, and the difference present pixel number accumulating portion 15 counts the number of pixels having a difference that is equal to or larger than the predetermined threshold B between the input image signal of the immediately previous frame delayed by the frame delaying portion 11 and the input image signal of the current frame. The threshold B holding portion 17 holds the predetermined threshold B.

When the number of pixels having a difference that is equal to or larger than the predetermined threshold B is smaller than a predetermined threshold C, the same image determining portion 16 detects the previous frame and the current frame as the same images and outputs the same image detecting signal, and the threshold C holding portion 18 holds the predetermined threshold C.

When the input image signal of the immediately previous frame and the input image signal of the current frame are completely the same, the number of pixels having a difference that is equal to or larger than the threshold B is zero regardless of the value of the threshold B. However, actually, a slight difference may occur in the images that are supposed to be completely the same due to noise by MPEG compression, etc., and therefore, a certain degree of permissible range is set for the same image determination by setting the predetermined threshold B and the predetermined threshold C.

For example, in a case where the resolution of the input image is a Full-HD size (1920 pixels by 1080 pixels) with an 8-bit monochromatic tone, when a pixel value five of noise is permitted on average in each pixel of consecutive frame images, five is set for the threshold B and pixels having a difference of pixel value of five or more is counted. When a pixel having a difference that is equal to or larger than the threshold B is permitted to be present up to 3% of the entire number of pixels, 1920×1080×0.03=62208 is set for the threshold C, and when the number of pixels having a difference that is equal to or larger than the predetermined threshold B is equal or lower than 62208, the consecutive frame images are detected as the same images.

Figure 9:
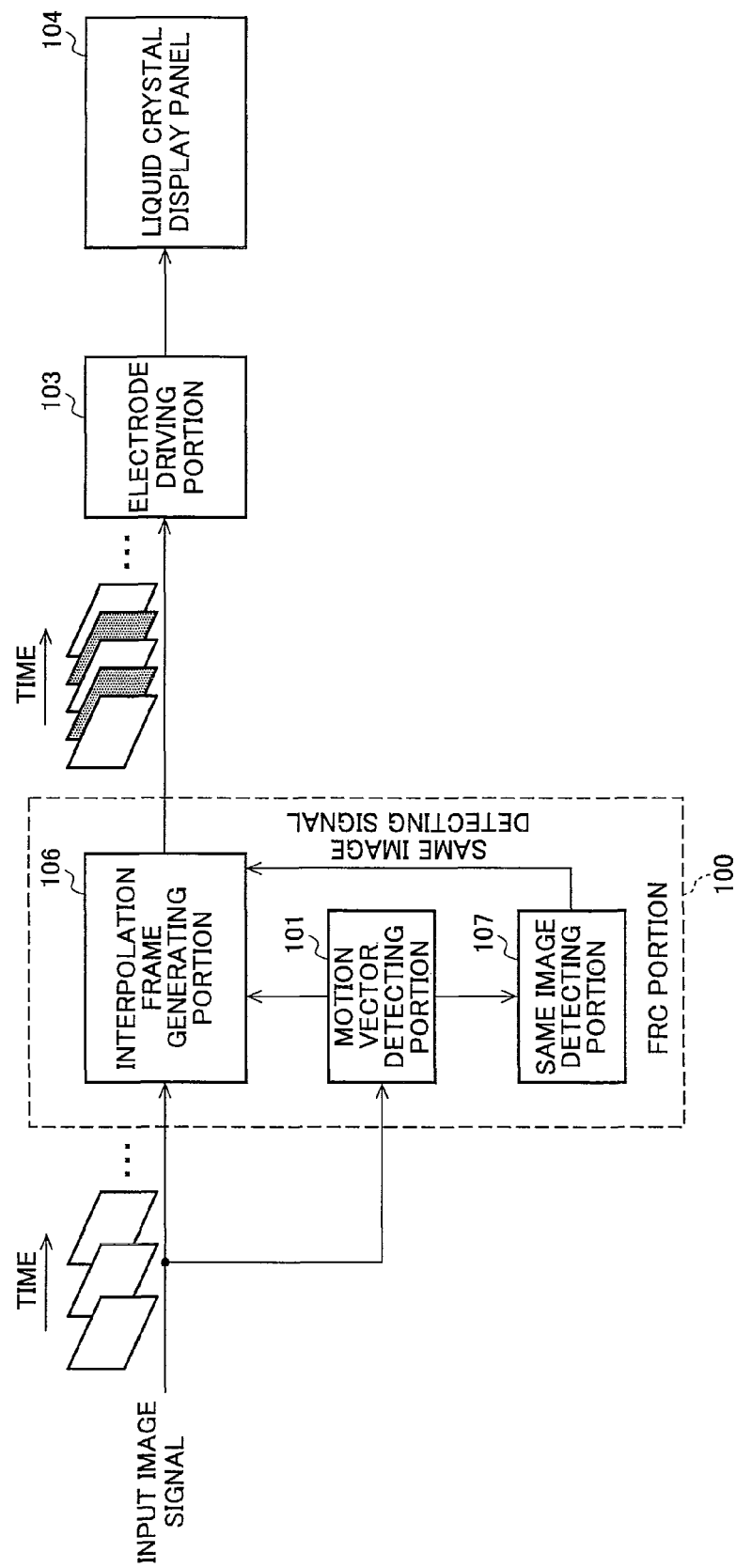
FIG. 9 is a block diagram of another example of a schematic configuration of an FRC drive display circuit in an embodiment of the image displaying device of the present invention.

FIG. 9 is a block diagram of another example of a schematic configuration of the FRC drive display circuit in the present invention and, in FIG. 9, the FRC drive display circuit includes the FRC portion 100 that converts the number of frames of the input image signal by interpolating an image signal to which the motion compensation processing has been given between frames of the input image signal, the active-matrix liquid crystal display panel 104 having a liquid crystal layer and an electrode for applying scan signals and data signals to the liquid crystal layer, and an electrode driving portion 103 for driving the scan electrodes and the data electrodes of the liquid crystal display panel 104 based on the image signal subjected to the frame rate conversion by the FRC portion 100.

The FRC portion 100 includes the motion vector detecting portion 101 that detects motion vector information from the input image signal, the interpolation frame generating portion 106 that generates an interpolation frame based on the motion vector information acquired by the motion vector detecting portion 101, and a same image detecting portion 107 that detects a case where the same images continue in the input image signal.

A difference from the exemplary configuration of the FRC drive display circuit shown in FIG. 6 is that the same image detecting portion 107 is used to detect that the same images continue based on a motion vector signal output from the motion vector detecting portion 101.

Figure 10:
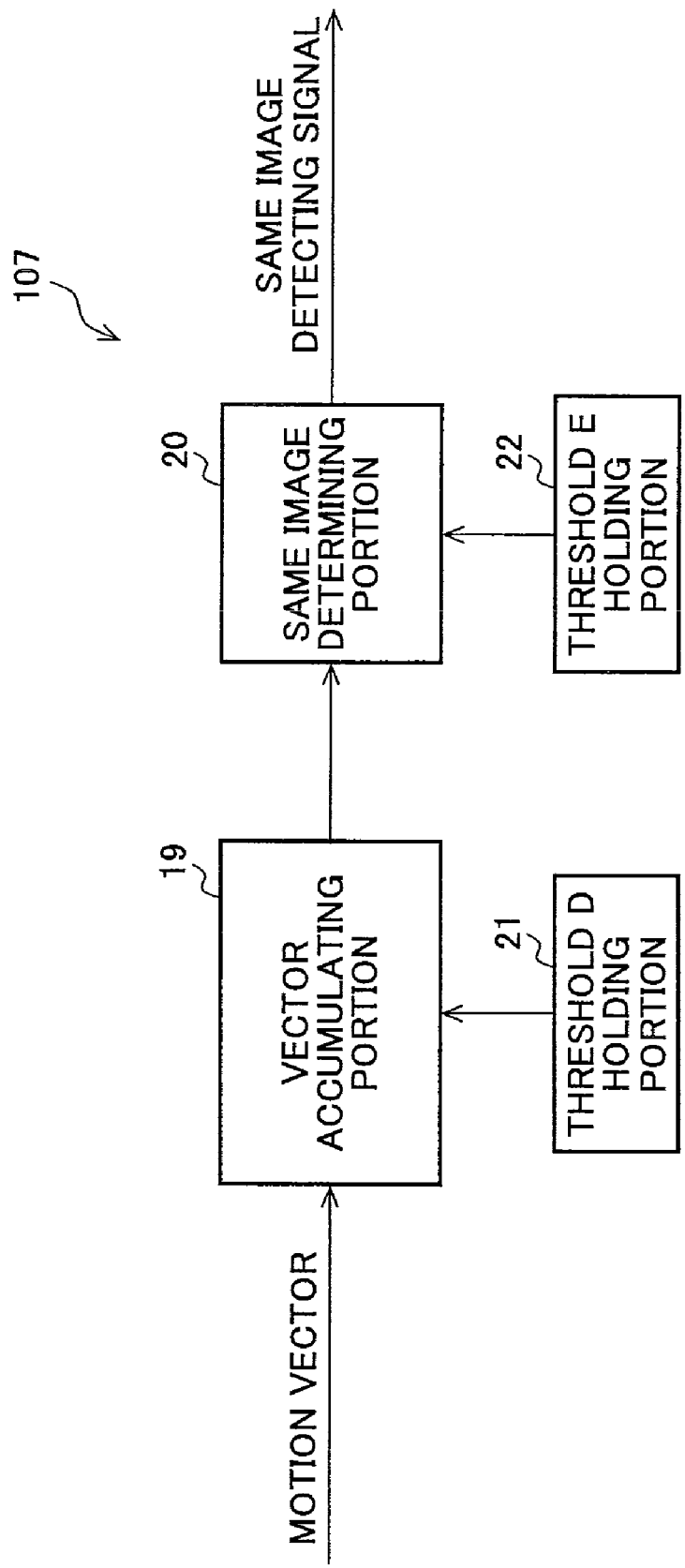
FIG. 10 is a block diagram of another example of a configuration of a same image detecting portion in an embodiment of the image displaying device of the present invention.

FIG. 10 is a block diagram of an example of a configuration of the same image detecting portion 107, and the same image detecting portion 107 of this example includes a vector accumulating portion 19, a same image determining portion 20, a threshold D holding portion 21, and a threshold E holding portion 22. The vector accumulating portion 19 counts the number of vectors having a length that is equal to or shorter than a predetermined threshold D among the motion vectors of each of the motion detected blocks that are output from the motion vector detecting portion 101, and the threshold D holding portion 21 holds the predetermined threshold D.

When the number of vectors counted by the vector accumulating portion 19 is larger than the predetermined threshold E, the same image determining portion 20 detects the previous frame and the current frame as the same images and outputs the same image detecting signal, and the threshold E holding portion 22 holds the predetermined threshold E.

When the input image signal of the immediately previous frame and the input image signal of the current frame are completely the same, any of the motion vectors of each of the motion detection blocks are supposed to be zero. However, actually, for the reasons that the motion vectors other than zero-vector may be erroneously detected in an area having the same color without texture in the image, that the motion vectors may be erroneously detected due to the effect of noise by MPEG compression, etc., and that the motion vectors may be erroneously detected when the motion vector detection in the next frame is performed with reference to the result of the motion vector detection in the previous frame, a certain degree of permissible range is set for the same image determination by setting the predetermined threshold D and the threshold E.

For example, in a case where the resolution of the input image is a Full-HD size (1920 pixels by 1080 pixels) with an 8-bit monochromatic tone, the motion vector detection block is 8 pixels by 8 pixels in size, and there are 32400 pieces of motion detection blocks in total, when the motion vectors having a length of one pixel or below are regarded as zero-vectors, the threshold D is set to one and the number of motion vectors having a length of one or below is counted. In a case where the images are defined as the same when the number of motion vectors having a length that is equal to or less than the threshold D amounts to 98% or more of the entire motion detection blocks, that is, when 2% of the motion vector detection errors are permitted, 32400×0.98=31752 is set for the threshold E, and when the number of motion vectors that is equal to or less than the predetermined threshold D is equal or more than 31752, the consecutive frame images are detected as the same images.

Although two types of FRC drive display circuits and three types of same image detecting methods have been described in the description above, the same image detection may be performed by using any one of them or the same image detection may be performed by using a plurality of them in combination.

Figure 11:
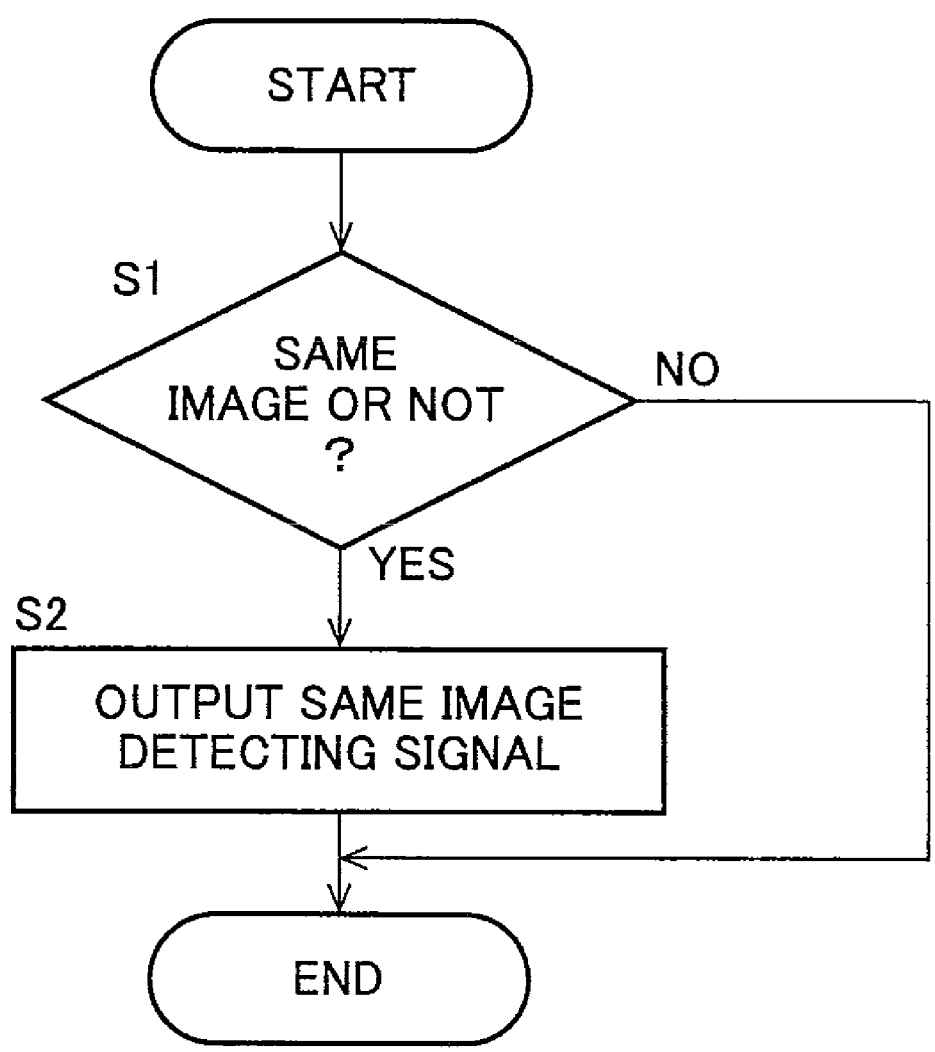
FIG. 11 is a flowchart of an example of a processing procedure of the same image detecting portion in an embodiment of the image displaying device of the present invention.

FIG. 11 is a flowchart of an exemplary processing procedure in the same image detecting portion 105 or the same image detecting portion 107. It is determined whether or not two consecutive frames of the input image signal are the same images (step S1), and if it is determined that the both are the same images, the same image detecting signal is output (step S2) to finish the processing. If it is determined as not the same images, the processing is directly finished. Note that, the processing flow above is a processing procedure for one frame, which is repeatedly performed for each frame.

Next, description will be given in detail for the processing to prevent the image quality deterioration that is performed by the interpolation frame generating portion 106 when the same image detecting portion 105 or 107 detects continuation of the same images in the input image.

Figure 12:
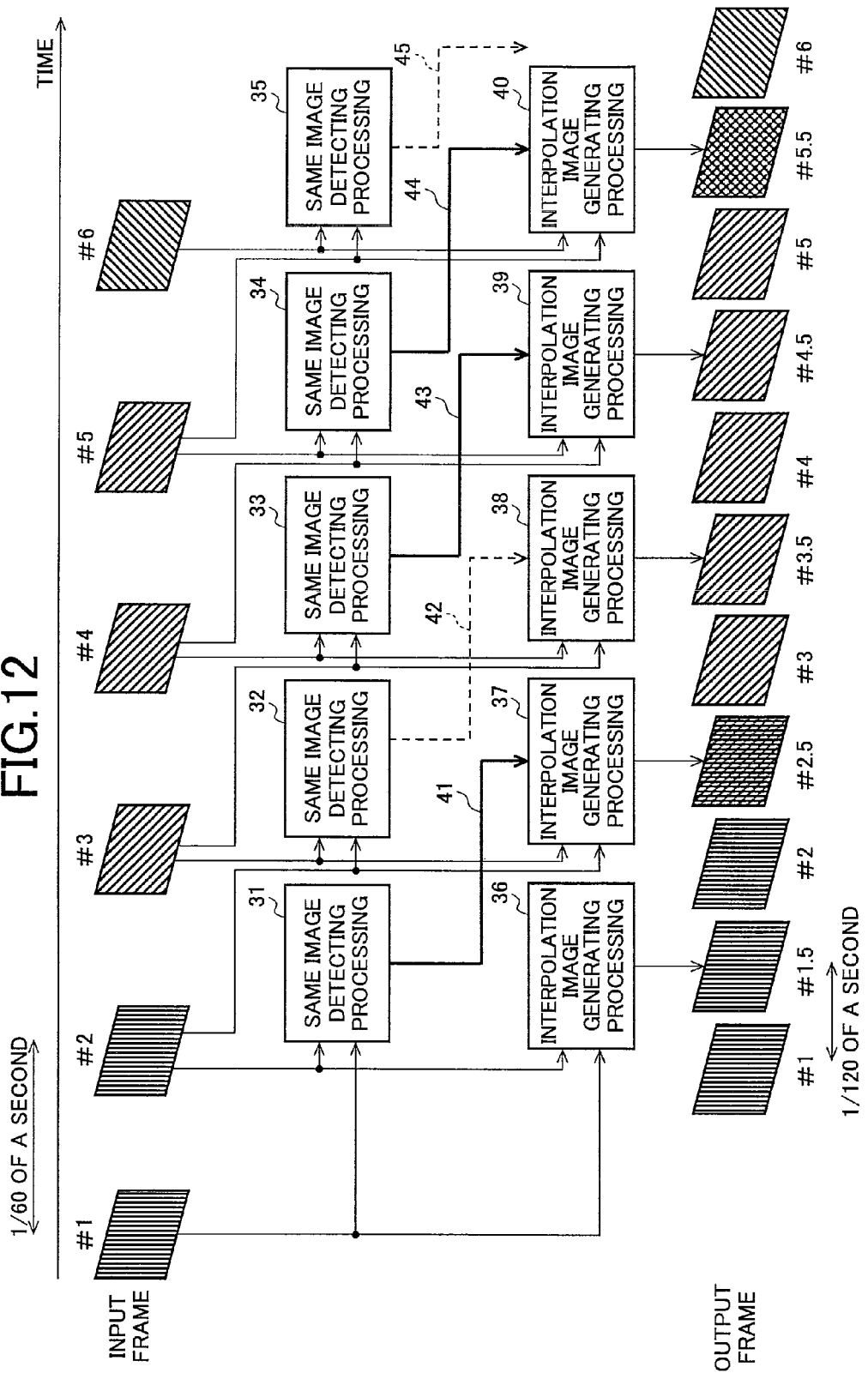
FIG. 12 is an explanatory diagram for explaining an FRC processing in an embodiment of the image displaying device of the present invention.

FIG. 12 is an explanatory diagram for explaining how the same image detecting processing and the FRC processing are performed for the input image in time series. In FIG. 12, same image detecting processing 31 to 35 is the processing performed by the same image detecting portions 105 and 107 described above with FIG. 6 and FIG. 9, and interpolation image generating processing 36 to 40 is the processing performed by the motion vector detecting portion 101 and the interpolation frame generating portion 106 described above with FIG. 6 and FIG. 9.

FIG. 12 illustrates six pieces of input frames #1 to #6. This represents an image sequence where a cinema video image is converted into 60 Hz by 2-3 pull down, and the frames #1 and #2, the frames #3 to #5 are the same images, while the frame #1, the frame #3 and the frame #6 are different images. Furthermore, in output frames, the image that the input frame is directly output is represented by the same frame number and an interpolation image by the FRC, for example, the interpolation image between the frames #1 and #2 is represented by the number with 0.5 increments, such as a frame #1.5.

As described above, the vector detection errors easily occur, particularly in a case where the result of the motion vector detection in the previous frame is zero-vector and the motion is present in the next frame. Corresponding thereto in FIG. 12 are the case where an interpolation image between the frames #2 and #3 is generated and the case where an interpolation image between the frames #5 and #6 is generated. First, description will be given in detail for the case where the interpolation image between the frames #2 and #3 is generated.

The frames #1 and #2 are the same images and the same image detecting processing 31 outputs a same image detecting signal 41. (Note that, in FIG. 12, the same image detecting signal 41 is represented by heavy solid line to show the case where the same image detecting signal is output. In addition, a same image detecting signal 42, for example, is represented by broken line to show the case where the same image detecting signal is not output. Also in the subsequent figures, the heavy solid line shows that the same image detecting signal is output and the broken line shows that the same image detecting signal is not output.)

Furthermore, all of the motion vectors detected by the interpolation image generating processing 36 are zero-vectors except for the detection errors due to noise, etc., and the frame #1.5 generated by the interpolation image generating processing 36 is the same image as the frames #1 and #2. In contrast, the frames #2 and #3 are different images, and when some motion vectors are detected by the interpolation image generating processing 37, the vector detection errors easily occur as described above since the motion vectors detected by the interpolation image generating processing 36 are referred to. Therefore, the frame #2.5 generated by the interpolation image generating processing 36 may be the image including many errors due to the vector detection errors.

The interpolation image generating processing 37 that has received the same image detecting signal 41 output from the same image detecting processing 31 performs the interpolation image generating processing with the motion compensation processing made ineffective to prevent the image including many errors from being output. That is, when the frames #1 and #2 are the same images, the interpolation image generating processing with the motion compensation processing made ineffective is performed in the FRC processing between the frames #2 and #3, which is the next processing, to prevent the interpolation image including many errors from being output.

That is, in this embodiment, when the image of an (n−1)th frame and the image of an n-th frame are the same, the interpolation image generating processing with the motion compensation processing made ineffective is performed in the FRC processing at least between the n-th frame and an (n+1)th frame to prevent that the interpolation image including many errors is output and the image quality deterioration is generated.

As described above, the interpolation image generating processing 36 to 40 shows the processing performed by the motion vector detecting portion 101 and the interpolation frame generating portion 106. Among them, it is the interpolation frame generating portion 106 that performs the interpolation image generating processing different from the ordinary one when the same image detecting signal is received. Description will be given for the specific configuration and the exemplary processing of the interpolation frame generating portion 106.

Figure 13:
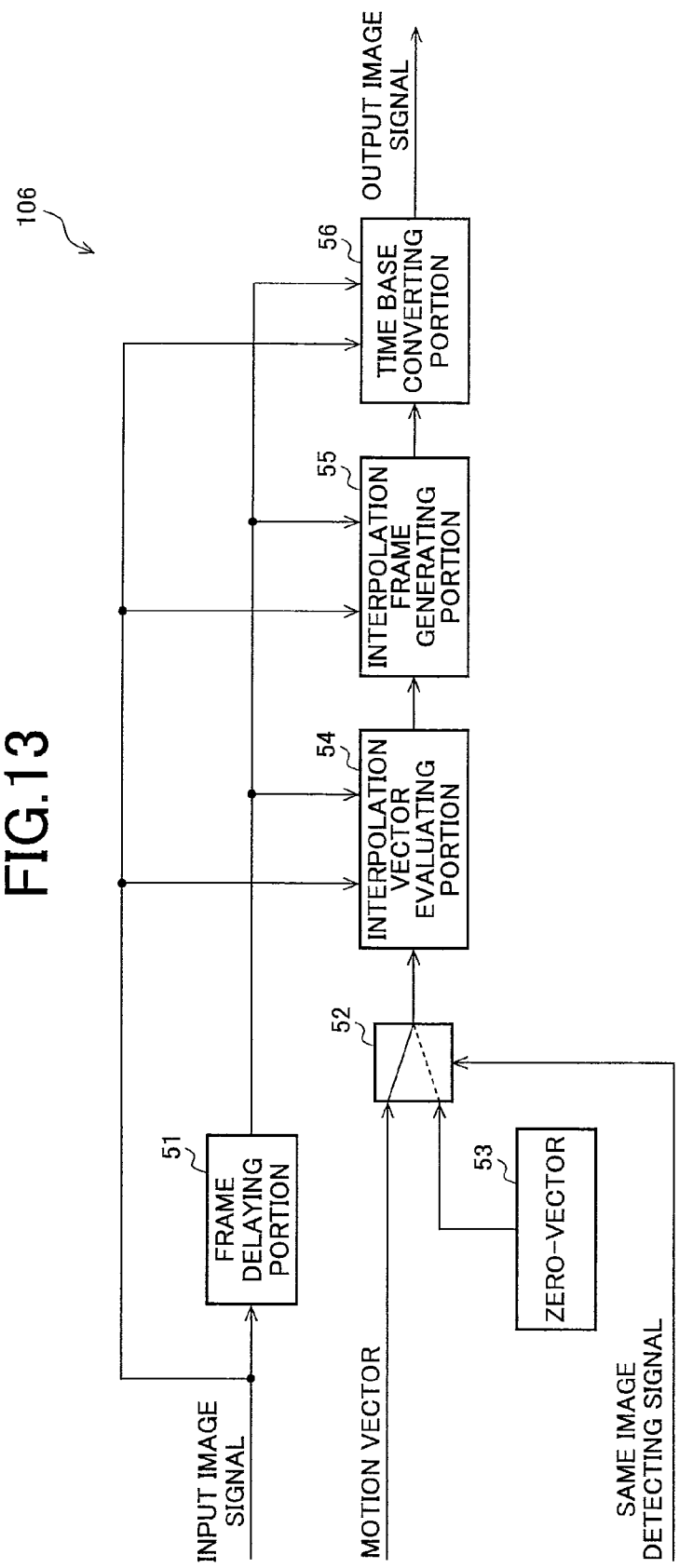
FIG. 13 is a block diagram of a first example of a schematic configuration of the interpolation frame generating portion in an embodiment of the image displaying device of the present invention.

FIG. 13 is a block diagram of a first example of a schematic configuration of the interpolation frame generating portion 106, and the interpolation frame generating portion 106 of this example includes a frame delaying portion 51, a switching portion 52, an interpolation vector evaluating portion 54, an interpolation frame generating portion 55, and a time base converting portion 56.

The input image signal of the immediately previous frame delayed by the frame delaying portion 51 and the input image signal of the current frame are supplied to the interpolation vector evaluating portion 54, the interpolation frame generating portion 55, and the time base converting portion 56. When the same image detecting signal is not input, the switching portion 52 supplies the motion vector detected by the motion vector detecting portion 105 to the interpolation vector evaluating portion 54, and when the same image detecting signal is input, a zero-vector 53 is supplied to the interpolation vector evaluating portion 54.

The interpolation vector evaluating portion 54 evaluates the input motion vector and allocates an optimum interpolation vector to the interpolation block between frames to output to the interpolation frame generating portion 55 based on the evaluation result. The interpolation frame generating portion 55 generates an interpolation frame with the use of the input image signal of the immediately previous frame and the input image signal of the current frame based on the interpolation vector input from the interpolation vector evaluating portion 54. The time base converting portion 56 alternately outputs the input frame and the interpolation frame to output an image signal having a frame rate twice as high as that of the original input image signal.

As described above, in the switching portion 52, the motion vector is supplied to the interpolation vector evaluating portion 54 to output a motion compensated interpolation image when the same image detecting signal is not input, on the other hand, the zero-vector 53 is supplied to the interpolation vector evaluating portion 54 and the same image as the input image signal of the immediately previous frame is output as the interpolation image when the same image detecting signal is input.

That is, the interpolation frame #2.5 output by the interpolation image generating processing 37 described above with FIG. 12 is the same image as the immediately previous input frame #2 by the processing of the case where the same image detecting signal is input. In this manner, by making the motion compensation processing between the input frames #2 and #3 ineffective, the frame #2.5 may be prevented from being the image including many errors due to the vector detection errors.

Figure 14:
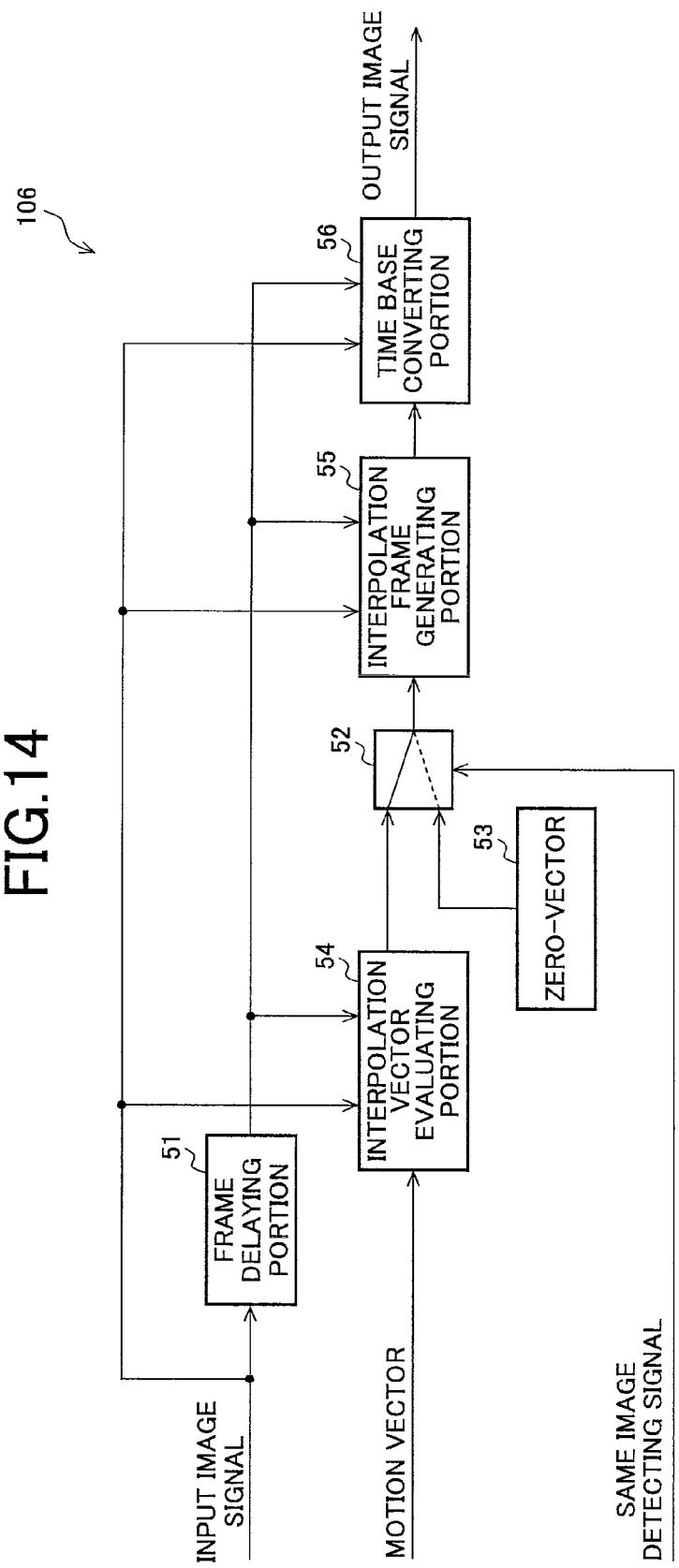
FIG. 14 is a block diagram of a second example of a schematic configuration of the interpolation frame generating portion in an embodiment of the image displaying device of the present invention.

FIG. 14 is a block diagram of a second example of a schematic configuration of the interpolation frame generating portion 106, and the interpolation frame generating portion 106 of this example includes the frame delaying portion 51, the switching portion 52, the interpolation vector evaluating portion 54, the interpolation frame generating portion 55, and the time base converting portion 56. A difference from the one shown in FIG. 13 is an inserted position of the switching portion 52. In FIG. 14, when the same image detecting signal is not input, the switching portion 52 supplies the interpolation vector output from the interpolation vector evaluating portion 54 to the interpolation frame generating portion 55, and when the same image detecting signal is input, the zero-vector 53 is supplied to the interpolation frame generating portion 55.

In this way, in the switching portion 52, the interpolation vector is supplied to the interpolation frame generating portion 55 to output a motion compensated interpolation image when the same image detecting signal is not input, on the other hand, the zero-vector 53 is supplied to the interpolation vector evaluating portion 55 and the same image as the input image signal of the immediately previous frame is output as an interpolation image when the same image detecting signal is input.

That is, the interpolation frame #2.5 output by the interpolation image generating processing 37 described above with FIG. 12 is the same image as the immediately previous input frame #2 by the processing of the case where the same image detecting signal is input. In this manner, by making the motion compensation processing between the input frames #2 and #3 ineffective, the frame #2.5 may be prevented from being the image including many errors due to the vector detection errors.

Figure 15:
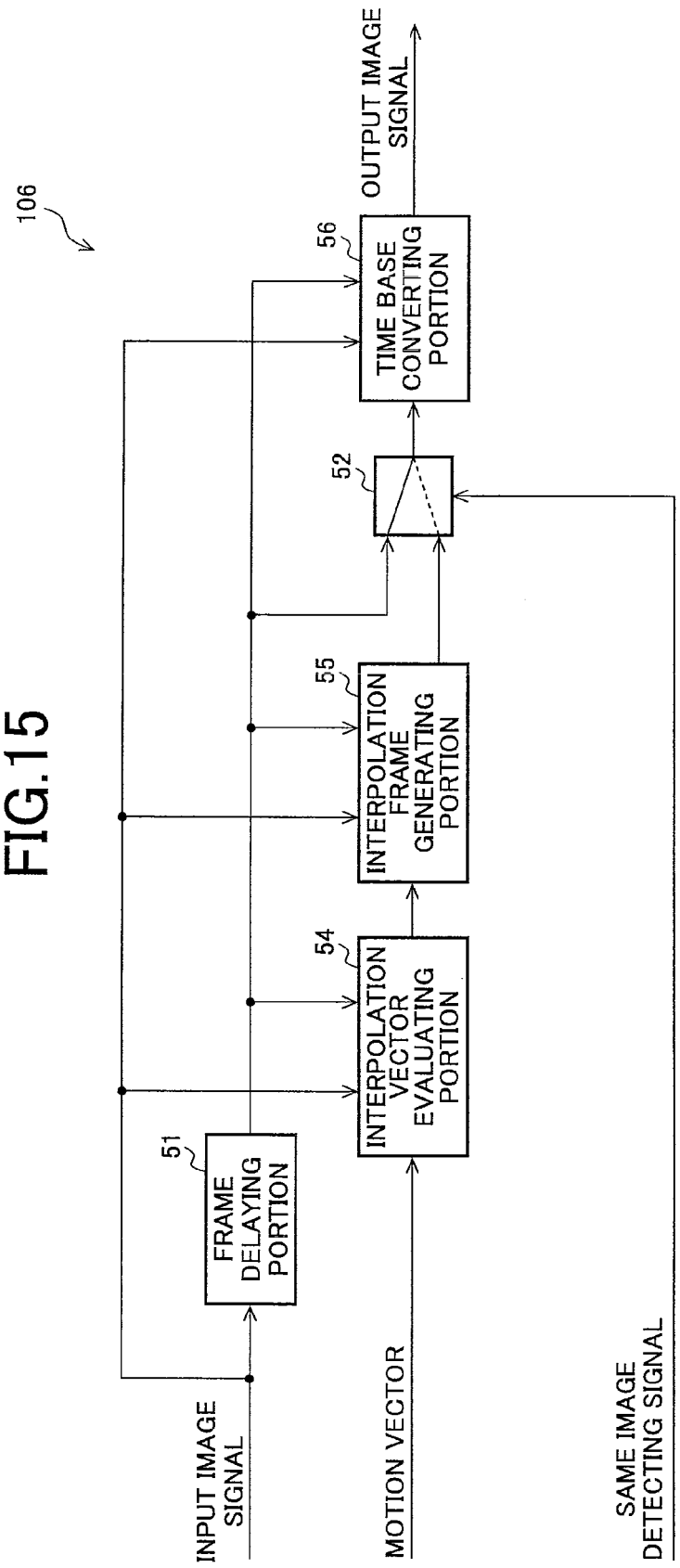
FIG. 15 is a block diagram of a third example of a schematic configuration of the interpolation frame generating portion in an embodiment of the image displaying device of the present invention.

FIG. 15 is a block diagram of a third example of a schematic configuration of the interpolation frame generating portion 106, and the interpolation frame generating portion 106 of this example includes the frame delaying portion 51, the switching portion 52, the interpolation vector evaluating portion 54, the interpolation frame generating portion 55, and the time base converting portion 56. A difference from the ones shown in FIG. 13 and FIG. 14 is an inserted position of the switching portion 52. In FIG. 15, when the same image detecting signal is not input, the switching portion 52 supplies the interpolation frame output from the interpolation frame generating portion 55 to the time base converting portion 56, and when the same image detecting signal is input, the input image signal of the immediately previous frame output from the frame delaying portion 51 is supplied to the time base converting portion 56.

In this way, in the switching portion 52, the interpolation frame output from the interpolation frame generating portion 55 is supplied to the time base converting portion 56 to output a motion compensated interpolation image when the same image detecting signal is not input, on the other hand, the input image signal of the immediately previous frame is supplied to the time base converting portion 56 and the same image as the input image signal of the previous frame is output as an interpolation image when the same image detecting signal is input.

That is, the interpolation frame #2.5 output by the interpolation image generating processing 37 described above with FIG. 12 is the same image as the immediately previous input frame #2 by the processing of the case where the same image detecting signal is input. In this manner, by making the motion compensation processing between the input frames #2 and #3 ineffective, the frame #2.5 may be prevented from being the image including many errors due to the vector detection errors.

Figure 16:
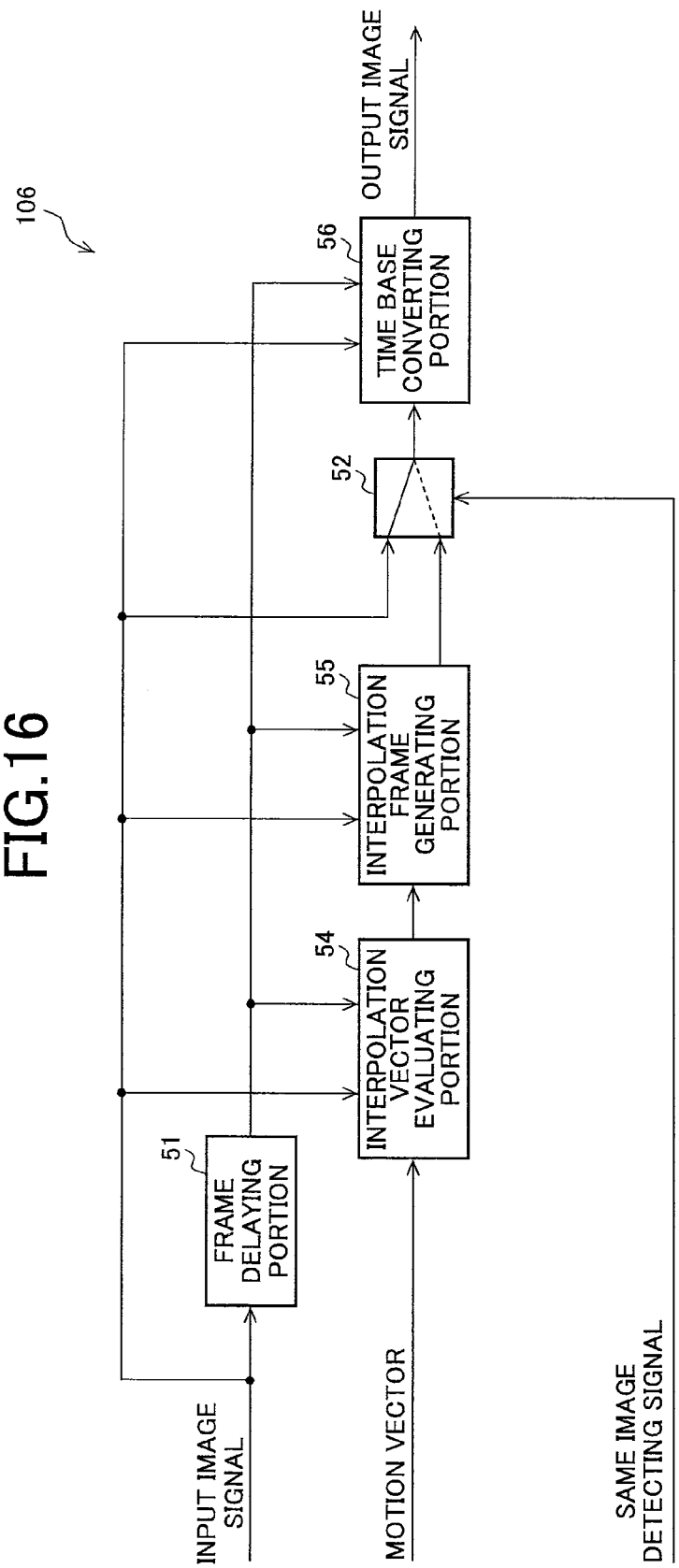
FIG. 16 is a block diagram of a fourth example of a schematic configuration of the interpolation frame generating portion in an embodiment of the image displaying device of the present invention.

FIG. 16 is a block diagram of a fourth example of a schematic configuration of the interpolation frame generating portion 106, and the interpolation frame generating portion 106 of this example includes the frame delaying portion 51, the switching portion 52, the interpolation vector evaluating portion 54, the interpolation frame generating portion 55, and the time base converting portion 56. A difference from the one shown in FIG. 15 is the image signal input to the switching portion 52. In FIG. 16, when the same image detecting signal is not input, the switching portion 52 supplies the interpolation frame output from the interpolation frame generating portion 55 to the time base converting portion 56, and when the same image detecting signal is input, the input image signal of the current frame is supplied to the time base converting portion 56.

In this way, in the switching portion 52, the interpolation frame output from the interpolation frame generating portion 55 is supplied to the time base converting portion 56 to output a motion compensated interpolation image when the same image detecting signal is not input, on the other hand, the input image signal of the current frame is supplied to the time base converting portion 56 and the same image as the input image signal of the current frame is output as an interpolation image when the same image detecting signal is input.

That is, the interpolation frame #2.5 output by the interpolation image generating processing 37 described above with FIG. 12 is the same image as the current input frame #3 by the processing of the case where the same image detecting signal is input. In this manner, by making the motion compensation processing between the input frames #2 and #3 ineffective, the frame #2.5 may be prevented from being the image including many errors due to the vector detection errors.

Figure 17:
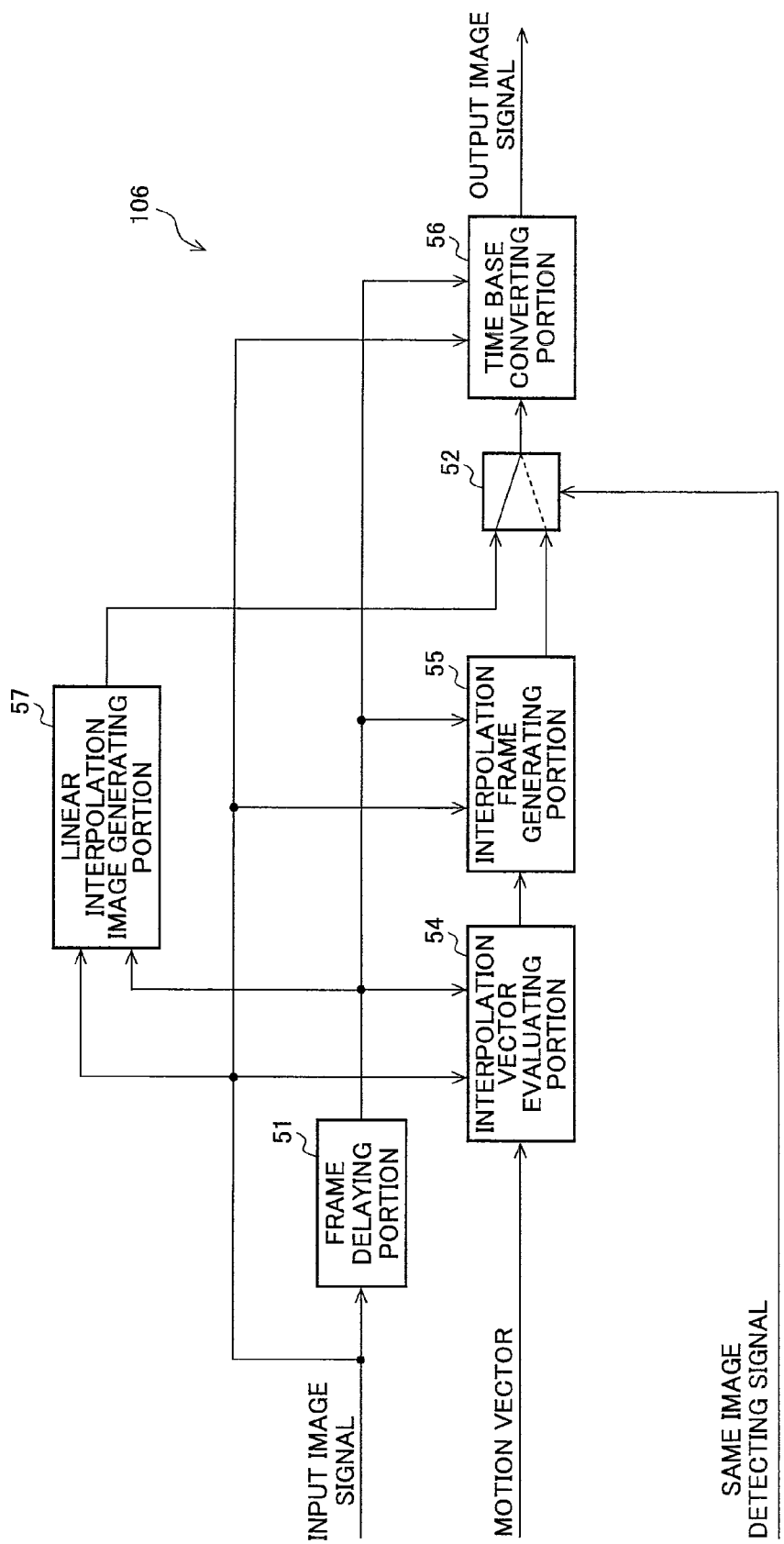
FIG. 17 is a block diagram of a fifth example of a schematic configuration of the interpolation frame generating portion in an embodiment of the image displaying device of the present invention.

FIG. 17 is a block diagram of a fifth example of a schematic configuration of the interpolation frame generating portion 106, and the interpolation frame generating portion 106 of this example includes the frame delaying portion 51, the switching portion 52, the interpolation vector evaluating portion 54, the interpolation frame generating portion 55, the time base converting portion 56, and a linear interpolation image generating portion 57. Differences from the ones shown in FIG. 15 and FIG. 16 are that the linear interpolation image generating portion 57 is disposed and that the image signal input to the switching portion 52 is different. The linear interpolation image generating portion 57 generates an interpolation image by performing the linear interpolation processing between two frames rather than the motion compensated interpolation processing.

In FIG. 17, when the same image detecting signal is not input, the switching portion 52 supplies the interpolation frame output from the interpolation frame generating portion 55 to the time base converting portion 56, and when the same image detecting signal is input, the linear interpolation image output from the linear interpolation image generating portion 57 is supplied to the time base converting portion 56.

In this way, in the switching portion 52, the interpolation frame output from the interpolation frame generating portion 55 is supplied to the time base converting portion 56 to output a motion compensated interpolation image when the same image detecting signal is not input, on the other hand, the linear interpolation image output from the linear interpolation image generating portion 57 is supplied to the time base converting portion 56 and the linear interpolation image is output as an interpolation image when the same image detecting signal is input.

That is, the interpolation frame #2.5 output by the interpolation image generating processing 37 described above with FIG. 12 is the linear interpolation image between the frames #2 and #3 by the processing of the case where the same image detecting signal is input. In this manner, by making motion compensation processing between the input frames #2 and #3 ineffective, the frame #2.5 may be prevented from being the image including many errors due to the vector detection errors.

Figure 18:
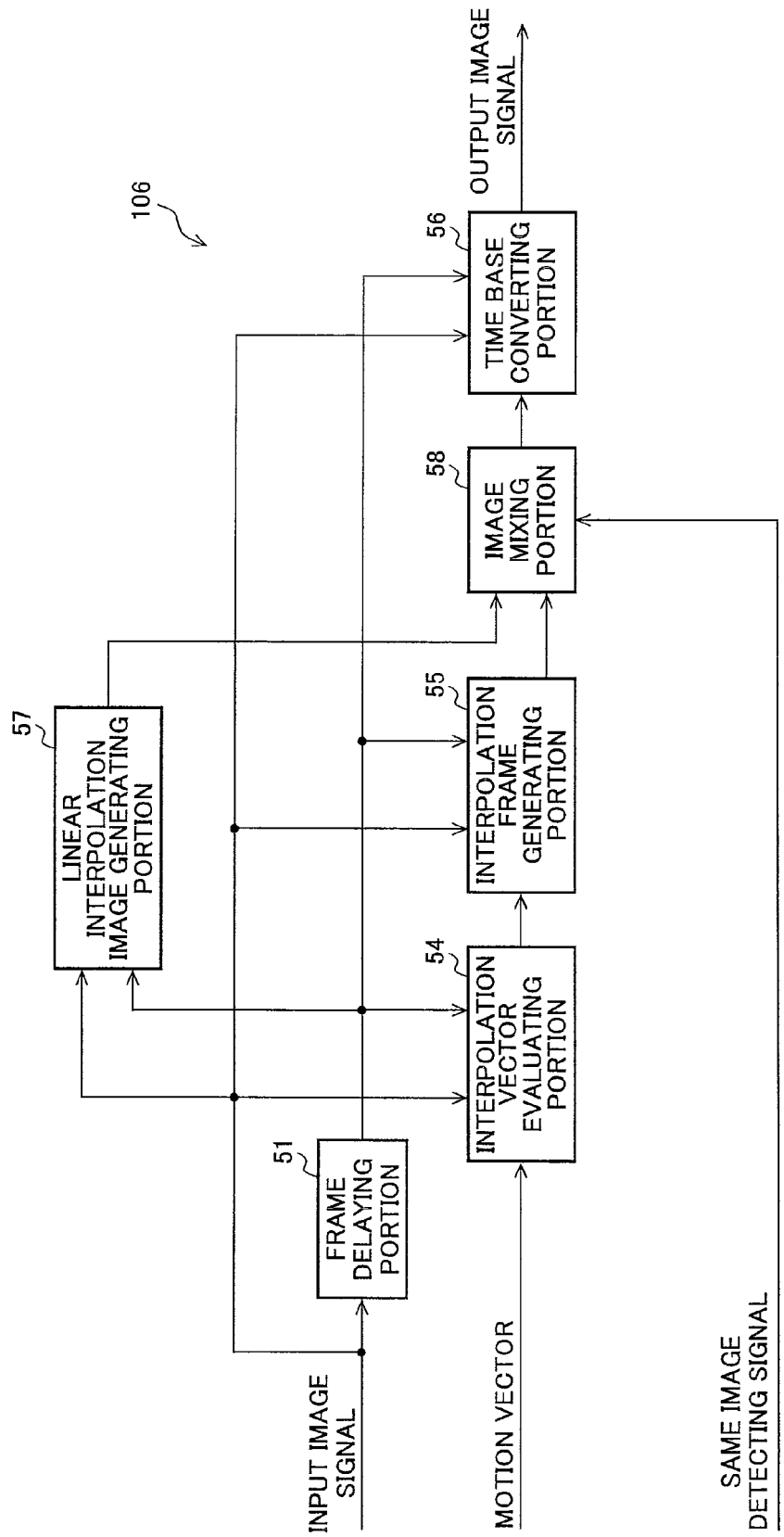
FIG. 18 is a block diagram of a sixth example of a schematic configuration of the interpolation frame generating portion in an embodiment of the image displaying device of the present invention.

FIG. 18 is a block diagram of a sixth example of a schematic configuration of the interpolation frame generating portion 106, and the interpolation frame generating portion 106 of this example includes the frame delaying portion 51, the interpolation vector evaluating portion 54, the interpolation frame generating portion 55, the time base converting portion 56, the linear interpolation image generating portion 57, and an image mixing portion 58. A difference from the one shown in FIG. 17 is that the image mixing portion 58 is disposed in place of the switching portion 52.

With the use of a predetermined weighted addition rate α, the image mixing portion 58 performs weighted addition of the interpolation frame output from the interpolation frame generating portion 55 at the ratio α and of the linear interpolation image output from the linear interpolation image generating portion 57 at the ratio 1-α, to generate a final interpolation image and supply to the time base converting portion 56. The weighted addition rate α is varied depending on the presence/absence of input of the same image detecting signal. For example, when the same image detecting signal is input, the image mixing portion 58 sets the weighted addition rate α=0 and supplies the image signal to which the linear interpolation processing has been given as an interpolation image to the time base converting portion 56 to prevent the interpolation image with the image quality deterioration due to the motion compensation errors from being output. On the other hand, when the same image detecting signal is not input, the weighted addition rate α=1 is set and the image signal to which the motion compensation processing has been given is supplied as an interpolation image to the time base converting portion 56 to achieve better image quality for the moving image.

In this way, in the image mixing portion 58, the interpolation frame output from the interpolation frame generating portion 55 is supplied to the time base converting portion 56 to output a motion compensated interpolation image when the same image detecting signal is not input, on the other hand, the linear interpolation image output from the linear interpolation image generating portion 57 is supplied to the time base converting portion 56 and the linear interpolation image is output as an interpolation image when the same image detecting signal is input.

That is, the interpolation frame #2.5 output by the interpolation image generating processing 37 described above with FIG. 12 is the linear interpolation image between the frames #2 and #3 by the processing of the case where the same image detecting signal is input. In this manner, by making the motion compensation processing between the input frames #2 and #3 ineffective, the frame #2.5 may be prevented from being the image including many errors due to the vector detection errors.

Since the weighted addition rate a may arbitrarily and variably be set, the rate α may be set to a substantially intermediate value between zero and one. This enables to control the deterioration of the image quality due to the motion compensation errors and to perform the motion compensation in the interpolation frame image at the same time, and this may appropriately improve both the image quality deterioration due to the motion blur and the image quality deterioration due to the motion compensation errors.

Figure 19:
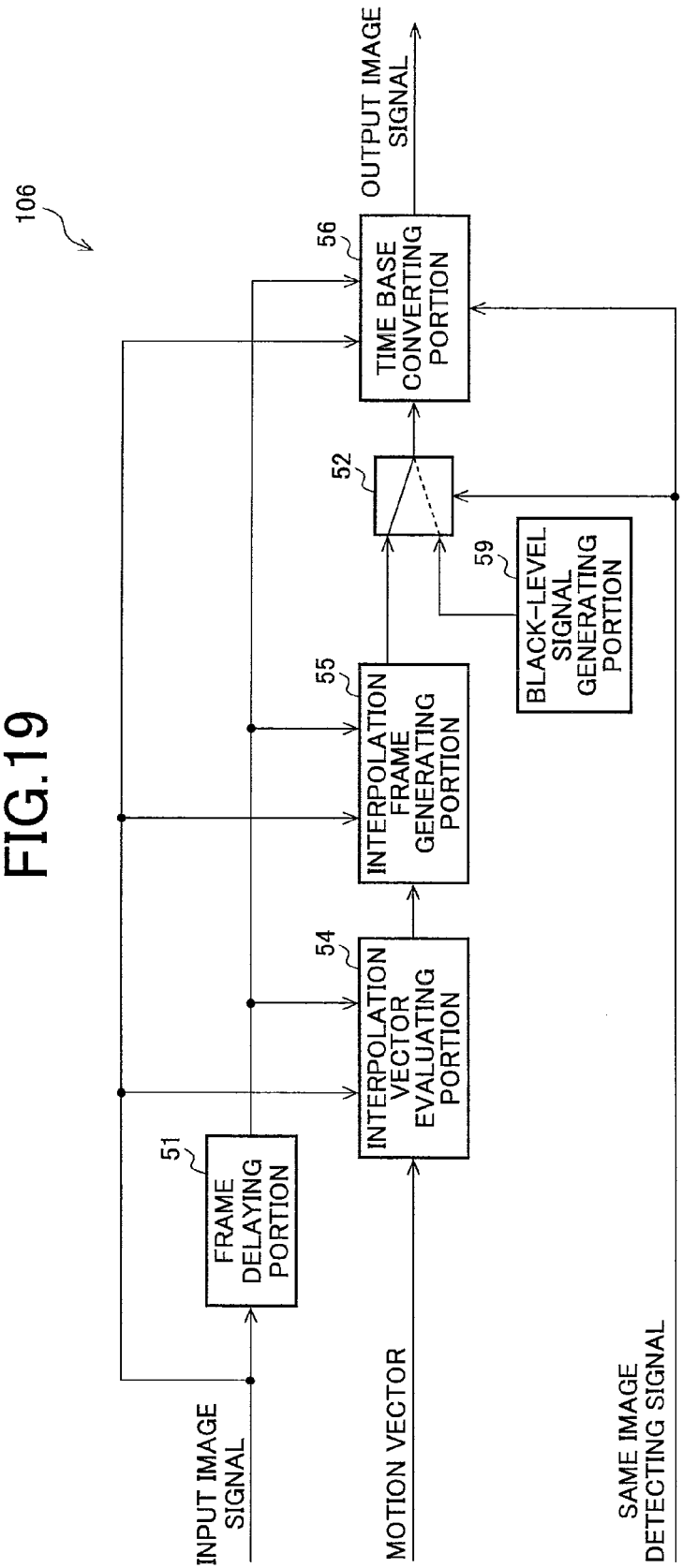
FIG. 19 is a block diagram of a seventh example of a schematic configuration of the interpolation frame generating portion in an embodiment of the image displaying device of the present invention.

FIG. 19 is a block diagram of a seventh example of a schematic configuration of the interpolation frame generating portion 106, and the interpolation frame generating portion 106 of this example includes the frame delaying portion 51, the switching portion 52, the interpolation vector evaluating portion 54, the interpolation frame generating portion 55, and the time base converting portion 56. Differences from the ones shown in FIG. 15 and FIG. 16 are that a black-level signal generating portion 59 is disposed, that an output signal from the black-level signal generating portion 59 is input to the switching portion 52, and that the same image detecting signal is also input to the time base converting portion 56.

In FIG. 19, when the same image detecting signal is not input, the switching portion 52 supplies the interpolation frame output from the interpolation frame generating portion 55 to the time base converting portion 56, and when the same image detecting signal is input, a predetermined monochromatic image signal such as a black-level signal generated by the black-level signal generating portion 59 is supplied to the time base converting portion 56.

The black-level signal is output as the interpolation image, which is the same as that the image is displayed only for a half period, and therefore, the luminance becomes half on time average. Thus, in order to compensate the reduction of the display luminance due to the shortening of the image display period, the luminance in the previous or subsequent frame of the black-level signal in the output frames needs to be doubled to make the luminance on time average uniform. Therefore, the time base converting portion 56 doubles the luminance of the input frame to output when the same image detecting signal is input. Alternatively, the emission luminance may be increased in a backlight (not shown) disposed on the backside of the liquid crystal display panel 104 to compensate the reduction of the display luminance due to the shortening of the image display period. Note that, the method for making the luminance uniform when the black-level signal is inserted may be another method without limiting to the above.

In this manner, in the switching portion 52, the interpolation frame output from the interpolation frame generating portion 55 is supplied to the time base converting portion 56 to output a motion compensated interpolation image when the same image detecting signal is not input, on the other hand, the black-level signal generated by the black-level signal generating portion 59 is supplied to the time base converting portion 56 and the black-level image is output as an interpolation image when the same image detecting signal is input.

That is, the interpolation frame #2.5 output by the interpolation image generating processing 37 described above with FIG. 12 is a predetermined monochromatic image signal by the processing of the case where the same image detecting signal is input. In this manner, by making the motion compensation processing between the input frames #2 and #3 ineffective, the frame #2.5 may be prevented from being the image including many errors due to the vector detection errors. In addition, according to this example, the image quality deterioration due to the motion blur caused by the hold-type display may also be controlled.

In addition to the above examples, when the previous frame and the current frame are the same images, the moving image quality improving effect may be maintained by preventing the image quality deterioration due to the motion-compensated FRC processing at the same time, for example, by the frame rate conversion by dividing the original image of the current frame into a plurality of frame images at a predetermined luminance ratio.

It is needless to say that the frame delaying portion 51 of the interpolation frame generating portion 106 described above with FIGS. 13 to 19 may be used with the frame delaying portion 11 of the same image detecting portion 105.

Back to FIG. 12, description will subsequently be given for how the input frame is processed with the procedure above. As described above, for the interpolation image between the frames #2 and #3, the interpolation image generating processing 37 that has received the same image detecting signal 41 through the same image detecting processing 31 for the immediately previous frames #1 and #2 performs the interpolation image generating processing with the motion compensation processing made ineffective as described above with FIGS. 13 to 19 and outputs an interpolation frame #2.5 to prevent the image including many errors due to the motion vector detection errors from being output.

For the interpolation image between the frames #3 and #4, since the immediately previous frames #2 and #3 are different images, the same image detecting signal is not output from the same image detecting processing 32. Therefore, the interpolation image generating processing 38 performs the interpolation image generating processing using the motion compensation processing to output an interpolation frame #3.5 to which the motion compensation processing has been given.

This case corresponds to the case where some motion vectors are present in the result of the motion vector detection in the previous frame and no motion is present in the next frame, in which zero-vector is often detected accurately as described above. This is because zero-vector is easily detected by adding zero-vector to the candidates of the initial displacement vector.

For the interpolation image between the frames #4 and #5, the interpolation image generating processing 39 that has received a same image detecting signal 43 from the same image detecting processing 33 for the immediately previous frames #3 and #4 performs the interpolation image generating processing with the motion compensation processing made ineffective as described above with FIGS. 13 to 19 to output an interpolation frame #4.5.

In this case, there is no motion since the immediately previous frames #3 and #4 are the same images, and there is also no motion since the next frames #4 and #5 are the same images. That is, the continuity of the motion is maintained and the vector detection errors caused by the absence of the motion continuity do not occur. Therefore, no problem occurs even when the interpolation image generating processing using the motion compensation processing is performed in the interpolation image generating processing 39, and there is also no problem since the image quality deterioration is not caused even when the interpolation image generating processing with the motion compensation processing made ineffective is performed as described above.

For the interpolation image between the frames #5 and #6, since the immediately previous frames #4 and #5 are the same images, the interpolation image generating processing 40 that has received the same image detecting signal 44 from the same image detecting processing 34 performs the interpolation image generating processing with the motion compensation processing made ineffective as described above with FIGS. 13 to 19 and outputs an interpolation frame #5.5 to prevent the image including many errors due to the motion vector detection errors from being output.

In this way, when the image of the (n−1)th frame and the image of the n-th frame are the same, the image including many errors may be prevented from being output by making the motion compensation processing ineffective in the interpolation image generating processing between the n-th frame and the (n+1)th frame.

Figure 20:
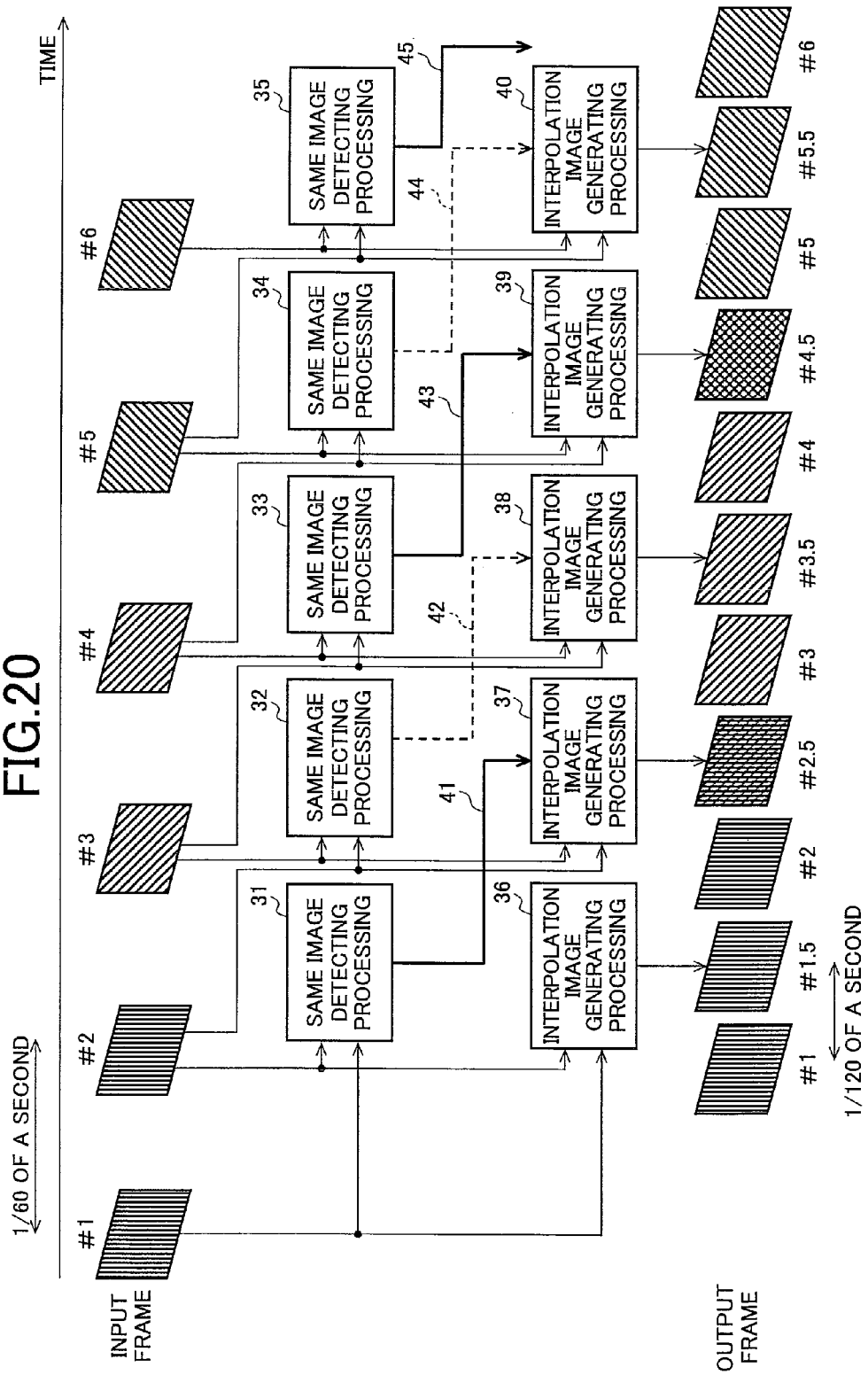
FIG. 20 is an explanatory diagram for explaining an FRC processing when slow reproduction is performed at 50% of reproduction speed in an embodiment of the image displaying device of the present invention.

Next, description will be given for the FRC processing when the slow reproduction is performed. FIG. 20 is a diagram for explaining the processing when the slow reproduction is performed at 50% of reproduction speed. The slow reproduction at 50% of reproduction speed is realized by outputting each frame of the original video image twice. In FIG. 20, the input frames #1 and #2, #3 and #4, and #5 and #6 are the same images, and the state of frames subjected to the slow reproduction at 50% of reproduction speed is shown.

In this case, the same image detecting processing 31, 33 and 35 outputs the same image detecting signals 41, 43 and 45, which are received by the interpolation image generating processing 37 and 39, where the interpolation image generating processing with the motion compensation processing made ineffective is performed to output interpolation frames #2.5 and #4.5. In this way, the image including many errors due to the motion vector detection errors may be prevented from being output by applying the above method of the present invention to the slow reproduction at 50% of reproduction speed. Note that, the same is true for the case where a cinema with a frame rate of 24 Hz is subjected to the 2-2 pull down processing and output to a display with a frame rate of 50 Hz.

Figure 21:
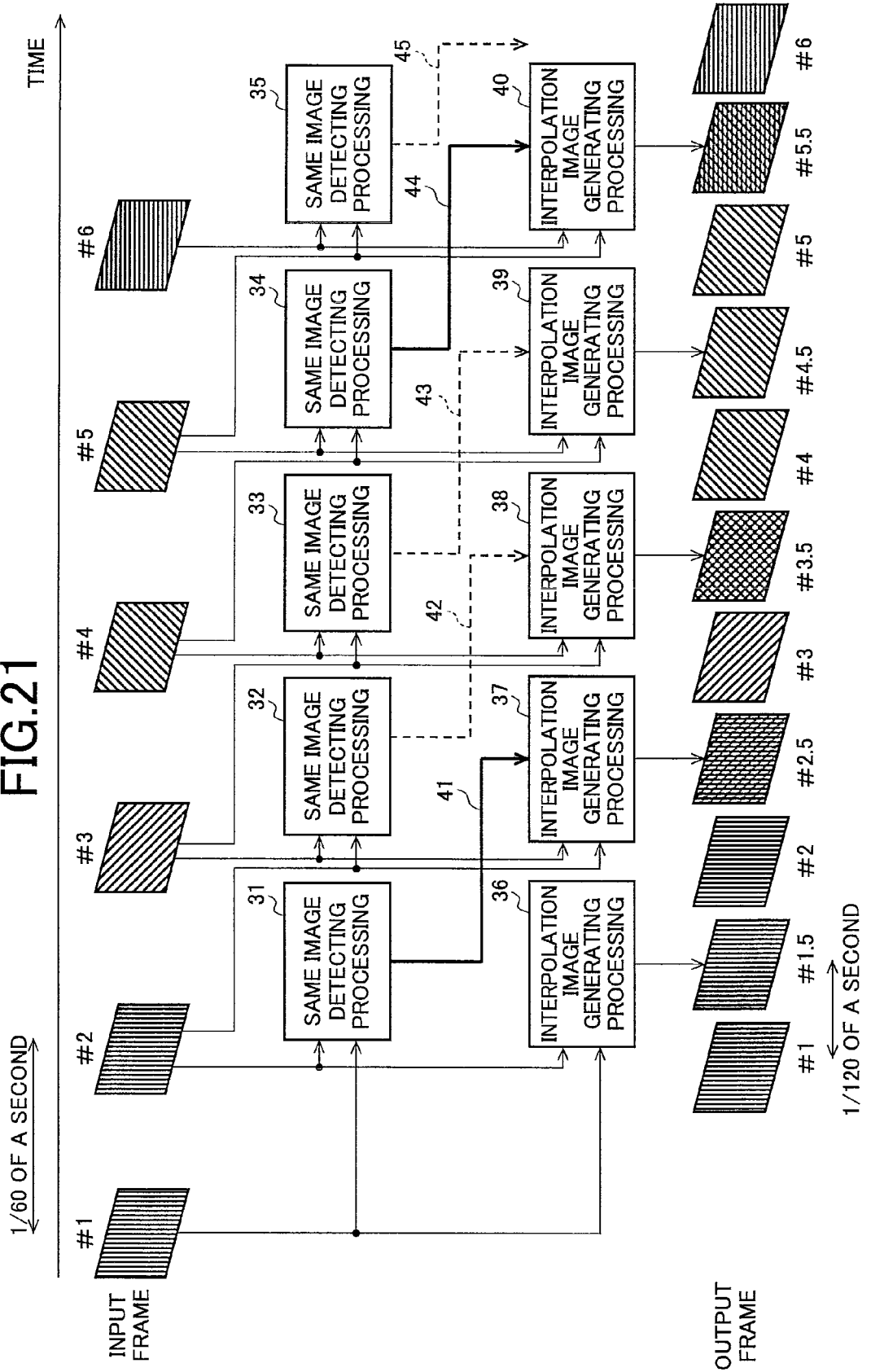
FIG. 21 is an explanatory diagram for explaining an FRC processing when slow reproduction is performed at about 67% of reproduction speed in an embodiment of the image displaying device of the present invention.

Furthermore, description will be given for the FRC processing when the slow reproduction is performed at another speed. FIG. 21 is a diagram for explaining the processing when the slow reproduction is performed at about 67% of reproduction speed. The slow reproduction at about 67% of reproduction speed is realized by outputting each frame of the original video image by changing the number of pieces thereof into two and one in this order at the same time. In FIG. 21, frames #1 and #2 are the same, a frame #3 is independent, frames #4 and #5 are the same, and a frame #6 is independent. In this way, by alternately outputting the original image in the order of two pieces and one piece, three pieces of frames are displayed when two pieces of frames of the original video image are reproduced, and the slow reproduction at about 67% is realized.

In this case, the same image detecting processing 31 and 34 outputs the same image detecting signals 41 and 44, which are received by the interpolation image generating processing 37 and 40, where the interpolation image generating processing with the motion compensation processing made ineffective is performed to output interpolation frames #2.5 and #5.5. The problem is an interpolation frame #3.5 between the frames #3 and #4. As described above, when the vector detection errors occur in a certain frame, the vector detection further in the next frame is affected, and the processing may be needed for several frames beginning from a discontinuous point of the motion vector until the vector detection is stably performed.

Although the interpolation frame #2.5 without errors is output regardless of the detected vector by performing the interpolation image generating processing with motion compensation processing made ineffective by the above processing in generating the interpolation frame between the frames #2 and #3, errors exist in the detected vector itself, and therefore, the vector detection in generating the interpolation frame between the next frames #3 and #4 is affected. Accordingly, when the interpolation image generating processing using the motion compensation processing is performed to output the motion compensated interpolation frame #3.5, there occurs another problem that the interpolation frame including many errors may be output.

A first method for solving this problem is that, once the same image is detected in the processing of the same image detecting portion 105 or the same image detecting portion 107, a processing is performed such that the same image detecting signal is continued to be output for a subsequent predetermined N-frame period to make the same image continuously detected state. In this manner, even when errors occur in the result of the vector detection by the same image, the same image detecting signal is continued to be output for the N-frame period until the vector detection is stably performed, which may prevent the interpolation image including many errors from being output.

Figure 22:
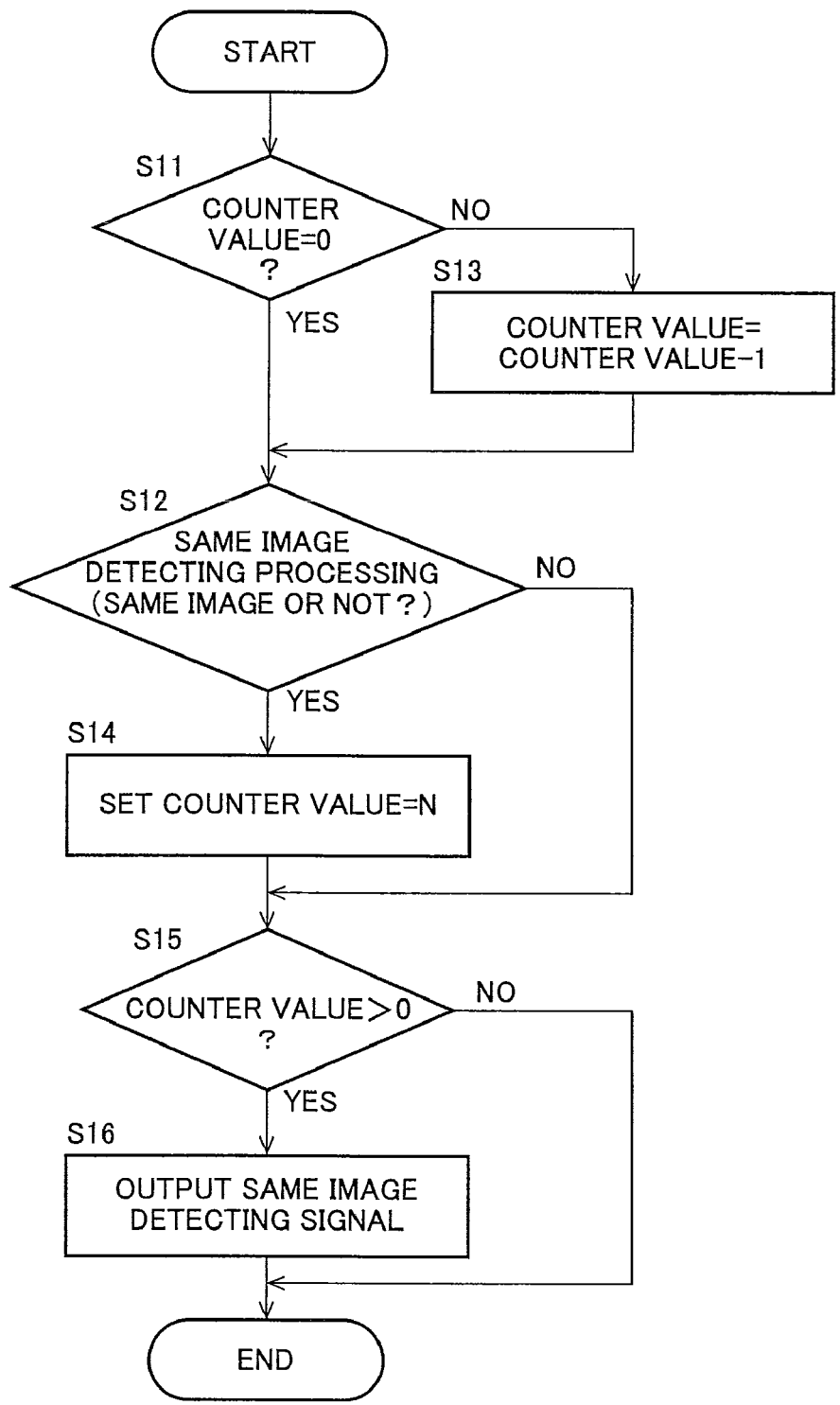
FIG. 22 is a flowchart of a second example of a processing procedure of the same image detecting portion in an embodiment of the image displaying device of the present invention.

FIG. 22 shows a specific example of the processing procedure thereof. Note that, zero is input as an initial value to a counter used in this procedure. First, it is determined whether or not a counter value is zero (step S11), and when the value is zero, it is determined whether or not two consecutive frames in the input image signal are the same images (step S12). When the counter value is other than zero, the counter value is reduced by one (step S13), and thereafter the processing at step S12 is performed. When it is determined at step S12 that the images are the same, the counter value is set to a predetermined value N (step S14). If it is determined that the images are not the same, the step S14 is skipped and whether or not the counter value is greater than zero is determined (step S15).

If it is determined at step S15 that the counter value is greater than zero, the same image detecting signal is output (step S16) to finish the processing. If it is determined that the counter value is not greater than zero, the processing is directly finished. Once the same image is detected to make the same image continuously detected state by carrying out the processing with such procedure, the same image detecting signal is continued to be output regardless of the result of the same image detection at least for the N-frame period until the counter value is zero. When the same image is detected again during the N-frame period, the counter value is set to N again and the same image detecting signal is continued to be output regardless of the result of the same image detection for another N-frame period therefrom. Note that, the processing flow above is a processing procedure for one frame, which is repeatedly performed for every frame.

Figure 23:
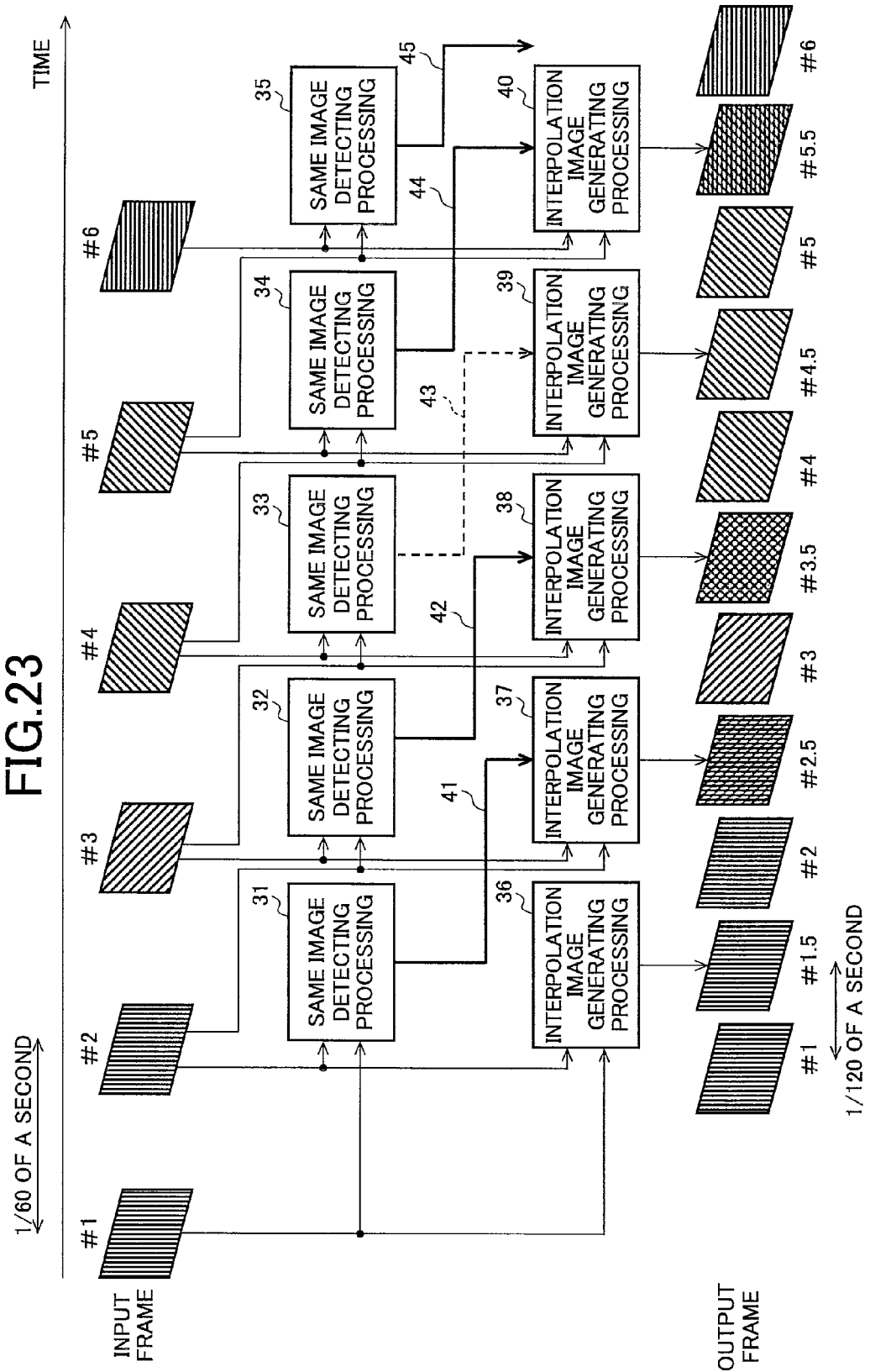
FIG. 23 is an explanatory diagram for explaining another example of an FRC processing when slow reproduction is performed at about 67% of reproduction speed in an embodiment of the image displaying device of the present invention.

FIG. 23 is a diagram for explaining the case where the present invention is applied to the slow reproduction at about 67% of reproduction speed under the condition of N=2 in the procedure shown in FIG. 22. In FIG. 23, similarly to FIG. 21, frames #1 and #2 are the same, a frame #3 is independent, frames #4 and #5 are the same, and a frame #6 is independent. In this case, similarly to the case of FIG. 21, the same image detecting processing 31 and 34 outputs the same image detecting signals 41 and 44, which are received by the interpolation image generating processing 37 and 40, where the interpolation image generating processing with the motion compensation processing made ineffective is performed to output interpolation frames #2.5 and #5.5.

The same image is detected in the same image detecting processing 31 by performing the processing for continuously detecting the same image as shown in FIG. 22, and thereafter for the two-frame (in the case of N=2) period including this, that is, also in the same image detecting processing 32 in addition to the same image detecting processing 31, the same image detecting signal 42 is output, which is received by the interpolation image generating processing 38, where the interpolation image generating processing with the motion compensation processing made ineffective is also performed to output an interpolation frame #3.5. Similarly, the same image is detected by the same image detecting processing 34, and thereafter for the two-frame period including this, that is, also in the same image detecting processing 35 in addition to the same image detecting processing 34, the same image detecting signal 45 is output.

When the same image detecting portions 105 and 107 detect that the (n−1)th frame and the n-th frame are the same images by carrying out the processing with such procedure, the motion compensation processing may be made ineffective for the period from the n-th frame to the (n+N+1)th frame, and the image including errors due to the motion vector detection errors may be prevented from being output also in the slow reproduction at 67% of reproduction speed, for example.

In the method above, by setting the predetermined number of frames N appropriately for the entire input frames in which the same images are present regularly or irregularly, the image including many errors due to the motion vector detection errors may be prevented from being output. The predetermined number of frames N may be decided, for example, depending on the number of frames required until the motion vector detecting portion 101 used in the FRC portion 100 may perform the stable vector detection, after the same images are present in the input frames and the detection errors occur. For example, N=5 may be set when the stable vector detection may be performed in five frames.

As described above, the same image detecting processing in the same image detecting portion 105 or the same image detecting portion 107 is thought to be affected by noise due to MPEG compression that is superimposed on the input image signal, etc. For example, when a cinema video image with a frame rate of 24 Hz is subjected to the 2-3 pull down processing to output to a display with a frame rate of 60 Hz, the same image detection is performed in some parts of the image, but the same image detection is not performed in other parts due to noise, etc., resulting that a phenomenon may occur that the interpolation image partly including errors due to the motion vector detection errors is output.

As a countermeasure thereto, the 2-3 pull-down video image such a cinema video image continues for a given time, and therefore, once the same image is detected, it is effective to lower a threshold for the same image detection to enhance resistance against noise, etc., that is, to add a so-called hysteresis processing.

For example, although the threshold A that is held by the threshold A holding portion 14 is used for the same image determination in an example of the configuration of the same image detecting portion 105 shown in FIG. 7, a threshold A-1 is used when the same image is not detected in the immediately previous processing and a threshold A-2 that is greater than the threshold A-1 is used when the same image is detected in the immediately previous processing so that the same image is detected more easily, resulting that hysteresis may be applied to the same image detection.

For example, although the threshold B that is held by the threshold B holding portion 17 and the threshold C that is held by the threshold C holding portion 18 are used for the same image determination in another example of the configuration of the same image detecting portion 105 shown in FIG. 8, a threshold B-1 and a threshold C-1 are used when the same image is not detected in the immediately previous processing and a threshold B-2 that is greater than the threshold B-1 and a threshold C-2 that is greater than the threshold C-1 are used when the same image is detected in the immediately previous processing so that the same image is detected more easily, resulting that hysteresis may be applied to the same image detection. The threshold B-1 and the threshold C-1 that are used when the same image is not detected are referred to as a threshold set (1) and the threshold B-2 and threshold C-2 that are used in the same image continuously detected state are referred to as a threshold set (2).

For example, also in an example of the configuration of the same image detecting portion 107 shown in FIG. 10, by using different threshold sets depending on whether or not the same image is detected in the immediately previous processing, hysteresis may be applied to the same image detection.

Figure 24:
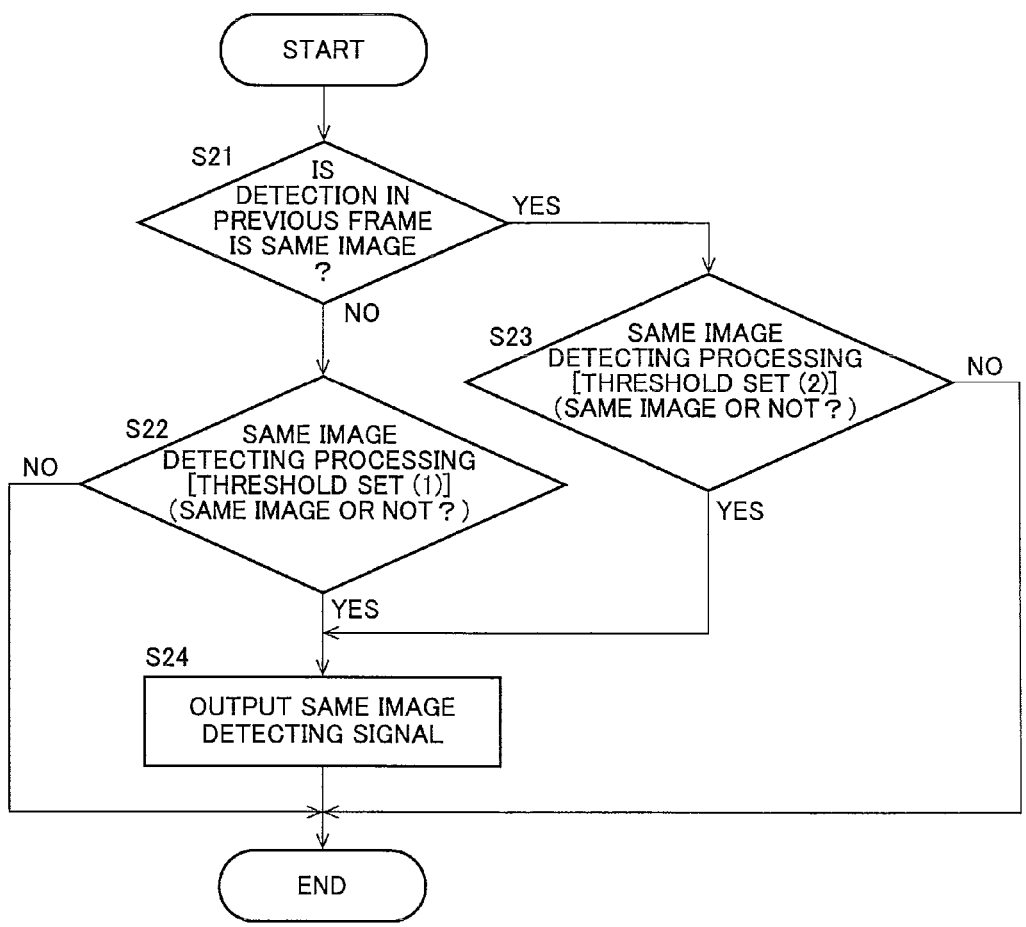
FIG. 24 is a flowchart of a third example of a processing procedure of the same image detecting portion in an embodiment of the image displaying device of the present invention.

FIG. 24 shows an example of the processing procedures when hysteresis is applied to the same image detection in the same image detecting portion 105 or the same image detecting portion 107 in this way. This processing needs a memory to hold a result of the same image detection in the previous frame. First, with reference to the result of the same image detection in the previous frame (step S21), when the detection result is not the same image, the threshold set (1) is used for performing the same image detecting processing for the current frame (step S22).

When the detection result in the previous frame is the same image, the threshold set (2) is used for performing the same image detecting processing for the current frame (step S23). If it is determined at step S22 or step S23 that the images are the same, the same image detecting signal is output (step S24)

to finish the processing. If it is not determined at step S22 or step S23 that the images are the same, the processing is directly finished. Note that, the processing flow above is a processing procedure for one frame, which is repeatedly performed for every frame.

Figure 25:
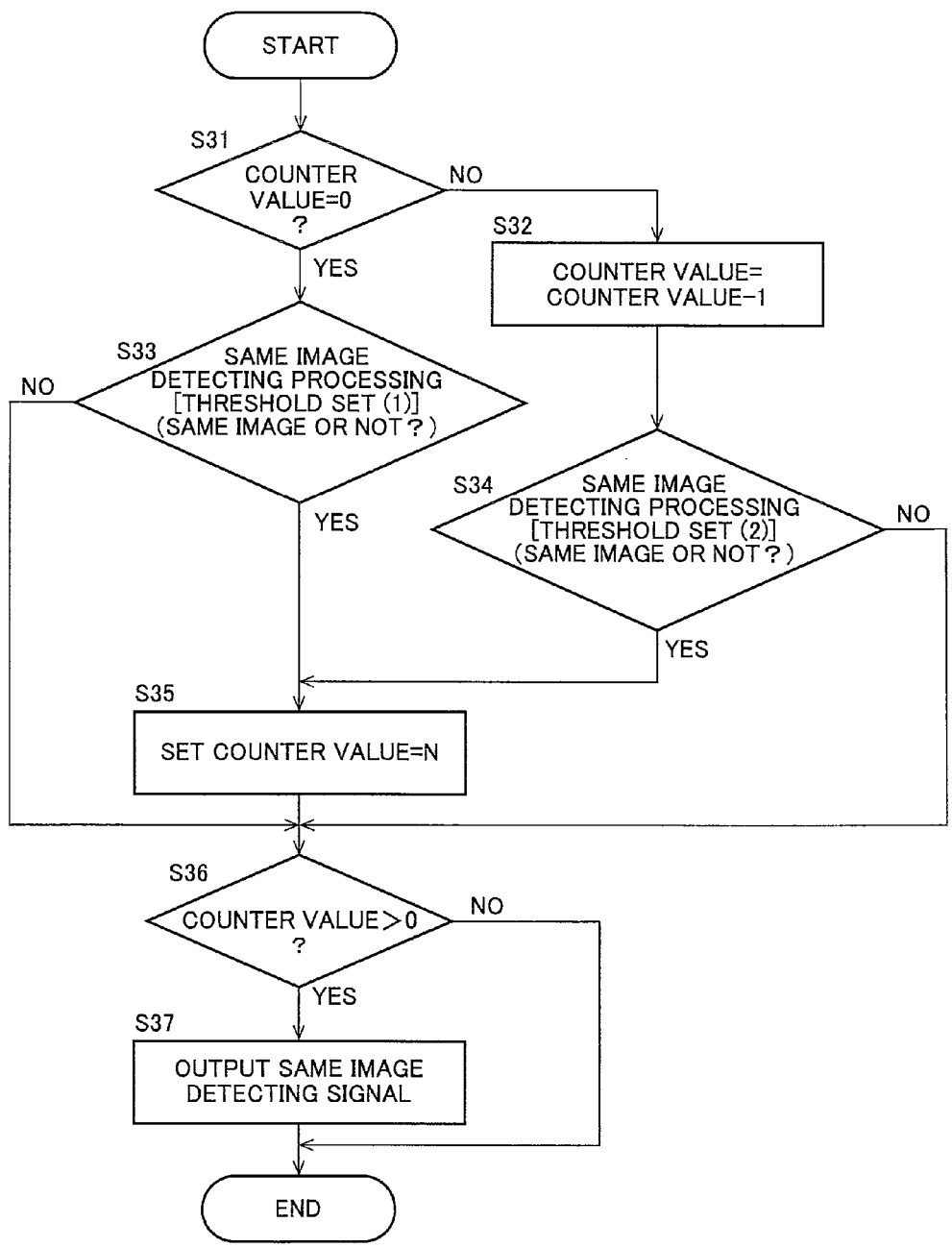
FIG. 25 is a flowchart of a fourth example of a processing procedure of the same image detecting portion in an embodiment of the image displaying device of the present invention.

FIG. 25 shows another example of the processing procedure when hysteresis is applied to the same image detection in the same image detecting portion 105 or the same image detecting portion 107. This example is a combination of the method for continuing the same image detected state over a plurality of frames period as described above with FIG. 22 and the processing for applying hysteresis to the same image detection as described above with FIG. 24. Note that, zero is input as the initial value to the counter used in this procedure.

First, whether or not the counter value is zero is determined (step S31), and when the value is zero, which indicates the same image not-detected state, the threshold set (1) is used for performing the same image detecting processing (step S33). When the counter value is greater than zero at step S31, which indicates the same image continuously detected state, the counter value is reduced by one (step S32), and the threshold set (2) is used for performing the same image detecting processing (step S34). If it is determined at step S33 or step S34 that the images are the same, the counter value is set to a predetermined value N (step S35), and if it is determined that the images are not the same, the procedure proceeds to step S36 without performing the processing at step S35.

Next, whether or not the counter value is greater than zero is determined (step S36), and when the counter value is greater, the same image detecting signal is output (step S37) to finish the processing. When the counter value is not greater than zero, that is, when the counter value is zero, the processing is directly finished.

By carrying out the processing with such procedure, the threshold set (1) is used for performing the same image detection in the same image not-detected state, and once the same image is detected and the same image continuously detected state is made, the threshold set (2) is used for performing the same image detection at least for the N-frame period until the counter value is zero and the same image detection information is continued to be output regardless of the detection result at the same time.

When the same image is detected again during the N-frame period, the counter value is set to N again, and the threshold set (2) is used for performing the same image detection for another N-frame period therefrom and the same image detection information is continued to be output regardless of the detection result at the same time. Note that, the processing flow above is a processing procedure for one frame, which is repeatedly performed for every frame.

As described above, in the image displaying device according to the present embodiment, when the image of the (n−1)th frame and the image of the n-th frame in the input image signal are substantially the same, the motion compensation processing is made ineffective in the interpolation image generating processing between the n-th frame and the (n+1)th frame to output an interpolation image to which the motion compensation processing has not been given so that the interpolation image including many errors may be prevented from being output. That is, in a moving image in which a plurality of pieces of the same images may continue, the image quality deterioration due to errors of the motion compensation frame rate conversion (FRC) processing may be prevented.

The image displaying device of the present invention is not limited to the liquid crystal display using the liquid crystal panel as the display panel, but is applicable to general image displaying devices having the hold-type display characteristics such as organic EL displays and electrophoretic displays. In addition, it is needless to say that the input image signal is not limited to a television broadcasting signal, but may be various image signals such as the image signal reproduced from an external media.

In the above description, although an example of the embodiments about the image processing device and method of the present invention have been described, the description also facilitates understanding of an image processing program that executes the present image processing method by a computer as a program, and a program recording medium in which the image processing program is recorded on a computer readable recording medium.

In the above embodiment, an embodiment in which the image processing device of the present invention is integrally provided in the image displaying device is described. However, it is obvious that, the image processing device of the present invention may be provided, for example, in a video image output device such as various recording media reproducing devices without limiting to the above.

The invention claimed is:

1. An image displaying device, comprising:
a rate converting unit configured to interpolate an interpolation image signal between images of an input image signal made up of a time series of images, to convert a number of images of the input image signal; and
a determining unit configured to determine that two consecutive images of the input image signal are the same when a correlation between a first image of the two consecutive images, having an index n−1 (n is an arbitrary natural number), and a second image of the two consecutive images, having an index n, is larger than a predetermined amount, wherein
the rate converting unit includes an interpolation image generating unit that applies a motion compensation processing to the input image signal to generate an interpolation image signal based on motion vector information between images of the input image signal, and
interpolation of the image signal generated by applying the motion compensation processing is not performed at least between the image having the index n and an image having an index n+1 when the two consecutive images are determined to be the same by the determining unit.

2. The image displaying device as defined in claim 1, wherein
when the image having the index n−1 and the image having the index n are detected as the same images by the determining unit, the rate converting unit interpolates, between images of the input image signal, an image signal generated by making the motion compensation processing in the interpolation image generating portion ineffective at least between the image having the index n and the image having the index n+1.

3. The image displaying device as defined in claim 2, wherein
when the image having the index n−1 and the image having the index n are detected as the same images by the determining unit, the interpolation image generating unit sets a motion vector detected at least between the image having the index n and the image having the index n+1 to zero-vector to make the motion compensation processing ineffective.

4. The image displaying device as defined in claim 2, wherein
when the image having the index n−1 and the image having the index n are detected as the same images by the determining unit, the interpolation image generating unit sets an interpolation vector allocated between the image having the index n and the image having the index n+1 to zero-vector to make the motion compensation processing ineffective based on the motion vector detected at least between the image having the index n and the image having the index n+1.

5. The image displaying device as defined in claim 1, wherein
the interpolation image generating unit includes a motion vector detecting portion that detects motion vector information between consecutive frames or fields included in the input image signal and
an interpolation vector allocating portion that allocates an interpolation vector between the frames or the fields based on the motion vector information detected by the detecting portion.

6. The image displaying device as defined in claim 1, wherein
when the image having the index n−1 and the image having the index n are detected as the same images by the determining unit, the rate converting unit inserts, between images of the input image signal, an image signal of the image having the index n to convert the number of images of the input image signal at least between the image having the index n and the image having the index n+1.

7. The image displaying device as defined in claim 1, wherein
when the image having the index n−1 and the image having the index n are detected as the same images by the determining unit, the rate converting unit inserts, between images of the input image signal, an image signal of the image having the index n+1 to convert the number of images of the input image signal at least between the image having the index n and the image having the index n+1.

8. The image displaying device as defined in claim 1, wherein
when the image having the index n−1 and the image having the index n are detected as the same images by the determining unit, the rate converting unit inserts, between images of the input image signal, a linear interpolation image signal between the image having the index n and the image having the index n+1 to convert the number of images of the input image signal at least between the image having the index n and the image having the index n+1.

9. The image displaying device as defined in claim 1, wherein
when the image having the index n−1 and the image having the index n are detected as the same images by the determining unit, the rate converting unit inserts, between images of the input image signal, a predetermined monochromatic image signal to convert the number of images of the input image signal for at least between the image having the index n and the image having the index n+1.

10. The image displaying device as defined in claim 1, wherein
when the image having the index n−1 and the image having the index n are detected as the same images by the determining unit, the rate converting unit does not perform interpolation of the image signal generated by applying the motion compensation processing for a period from the image having the index n to an image having an index n+1+N, N being a predetermined natural number.

11. The image displaying device as defined in claim 1, wherein
when the image having the index n−1 and the image having the index n are detected as the same images, the determining unit reduces a threshold for same image detection for the image having the index n and the image having the index n+1.

12. The image displaying device as defined in claim 1, wherein
the determining unit obtains a sum of absolute values of differences of pixels in the image having the index n−1 and pixels in the image having the index n, and detects the two images as the same images when the sum of absolute values of differences is smaller than a predetermined threshold.

13. The image displaying device as defined in claim 1, wherein
the determining unit counts the number of pixels in which a difference between pixels in the image having the index n−1 and pixels in the image having the index n exists at a predetermined threshold or more, and detects the two images as the same images when the counted value is smaller than another predetermined threshold.

14. The image displaying device as defined in claim 1, wherein
the determining unit counts the number of vectors in which a length of a motion vector detected between the image having the index n−1 and the image having the index n is equal to or smaller than a predetermined threshold, and detects the two images as the same images when the counted value is larger than the predetermined threshold.

15. The image displaying device as defined in claim 1, further comprising:
a plurality of determining units.

16. An image displaying method, comprising:
interpolating an interpolation image signal between images of an input image signal to convert the number of images of the input image signal;
detecting that two consecutive images of the input image signal are the same when a correlation between a first image of the two consecutive images, having an index n−1 (n is an arbitrary natural number) and a second image of the two consecutive images, having an index n is larger than a predetermined amount, wherein
the interpolating includes
an interpolation image generating step of applying a motion compensation processing to the input image signal to generate an interpolation image signal based on motion vector information between images of the input image signal, and
interpolation of the image signal generated by applying the motion compensation processing is not performed at least between the image having the index n and an image having an index n+1 when the two images are detected as the same images.

17. The image displaying method as defined in claim 16, wherein
the interpolating interpolates, between images of the input image signal, an image signal generated by making the motion compensation processing in the interpolation image generating step ineffective at least between the image having the index n and the image having the index n+1 when the two images are detected as the same images.

18. An image processing device, comprising:

a rate converting unit configured to interpolate an interpolation image signal between images of an input image signal made up of a time series of images, to convert a number of images of the input image signal; and a determining unit configured to determine that two consecutive images of the input image signal are the same when a correlation between a first image of the two consecutive images, having an index n−1 (n is an arbitrary natural number), and a second image of the two consecutive images, having an index n, is larger than a predetermined amount, wherein the rate converting unit includes an interpolation image generating unit that applies a motion compensation processing to the input image signal to generate an interpolation image signal based on motion vector information between images of the input image signal, and interpolation of the image signal generated by applying the motion compensation processing is not performed at least between the image having the index n and an image having an index n+1 when the two consecutive images are determined to be the same by the determining unit.

19. The image processing device as defined in claim 18, wherein the rate converting unit interpolates, between images of the input image signal, an image signal generated by making the motion compensation processing in the interpolation image generating portion ineffective at least between the image having the index n and the image having the index n+1 when the image having the index n−1 and the image having the index n are detected as the same images by the determining unit.

20. An image processing method, comprising:

interpolating an interpolation image signal between images of an input image signal to convert the number of images of the input image signal;

detecting that two consecutive images of the input image signal are the same when a correlation between a first image of the two consecutive images, having an index n−1 (n is an arbitrary natural number) and a second image of the two consecutive images, having an index n is larger than a predetermined amount, wherein the interpolating includes an interpolation image generating step of applying a motion compensation processing to the input image signal to generate an interpolation image signal based on motion vector information between images of the input image signal, and interpolation of the image signal generated by applying the motion compensation processing is not performed at least between the image having the index n and an image having an index n+1 when the two images are detected as the same images.

21. The image processing method as defined in claim 20, wherein the interpolating interpolates, between images of the input image signal, an image signal generated by making the motion compensation processing in the interpolation image generating step ineffective at least between the image having the index n and the image having the index n+1 when the two images are detected as the same images.

22. An image displaying device, comprising:

a rate converting unit configured to interpolate an interpolation image signal between images of an input image signal made up of a time series of images, to convert a number of images of the input image signal; and a determining unit configured to determine that two consecutive images of the input image signal are the same when a correlation between a first image of the two consecutive images, having an index n−1 (n is an arbitrary natural number), and a second image of the two consecutive images, having an index n, is larger than a predetermined amount, wherein the rate converting unit includes an interpolation image generating unit that applies a motion compensation processing to the input image signal to generate an interpolation image signal based on motion vector information between images of the input image signal, and the compensation intensity of the motion compensation processing is reduced between images of the input image signal for at least between the image having the index n and an image having the index n+1 when the two consecutive images are determined to be the same by the determining unit.

23. The image displaying device as defined in claim 22, wherein the interpolation image generating unit performs weighted addition of the image signal to which the motion compensation processing has been given and an image signal to which the motion compensation processing has not been given at a predetermined rate to generate an interpolation image signal, and the weighted addition ratio of the image signal to which the motion compensation processing has been given is reduced at least between the image having the index n and the image having the index n+1 when the image having the index n−1 and the image having the index n are detected as the same images by the determining unit.

24. The image displaying device as defined in claim 23, wherein the interpolation image generating unit defines the image signal to which the motion compensation processing has not been given as the interpolation image signal at least between the image having the index n and the image having the index n+1 when the image having the index n−1 and the image having the index n are detected as the same images, and the interpolation image generating unit defines the image signal to which the motion compensation processing has been given as the interpolation image signal between the image having the index n and the image having the index n+1 when the image having the index n−1 and the image having the index n are not detected as the same images.

25. The image displaying device as defined in claim 22, wherein when the image having the index n−1 and the image having the index n are detected as the same images by the determining unit, the compensation intensity of the motion compensation processing between images of the input image signal is reduced for a period from the image having the index n to an image having an index n+1+N (N being a predetermined natural number).

26. The image displaying device as defined in claim 22, wherein when the image having the index n−1 and the image having the index n are detected as the same images, the determining unit reduces a threshold for same image detection for the image having the index n and the image having the index n+1.

27. An image displaying method, comprising:

interpolating an interpolation image signal between images of an input image signal to convert the number of images of the input image signal;

detecting that two consecutive images of the input image signal are the same when a correlation between a first image of the two consecutive images, having an index n−1 (n is an arbitrary natural number) and a second image of the two consecutive images, having an index n is larger than a predetermined amount, wherein the interpolating includes an interpolation image generating step of applying a motion compensation processing to the input image signal to generate an interpolation image signal based on motion vector information between images of the input image signal, and reducing the compensation intensity of the motion compensation processing between images of the input image signal for at least between the image having the index n and an image having the index n+1 when the two images are detected as the same images.

28. An image processing device, comprising:

a rate converting unit configured to interpolate an interpolation image signal between images of an input image signal made up of a time series of images, to convert a number of images of the input image signal; and a determining unit configured to determine that two consecutive images of the input image signal are the same when a correlation between a first image of the two consecutive images, having an index n−1 (n is an arbitrary natural number), and a second image of the two consecutive images, having an index n, is larger than a predetermined amount, wherein the rate converting unit includes an interpolation image generating unit that applies a motion compensation processing to the input image signal to generate an interpolation image signal based on motion vector information between images of the input image signal, and the compensation intensity of the motion compensation processing is reduced between images of the input image signal for at least between the image having the index n and an image having the index n+1 when the two consecutive images are determined to be the same by the determining unit.

29. An image processing method, comprising:

interpolating an interpolation image signal between images of an input image signal to convert the number of images of the input image signal;

detecting that two consecutive images of the input image signal are the same when a correlation between a first image of the two consecutive images, having an index n−1 (n is an arbitrary natural number) and a second image of the two consecutive images, having an index n is larger than a predetermined amount, wherein the interpolating includes an interpolation image generating step of applying a motion compensation processing to the input image signal to generate an interpolation image signal based on motion vector information between images of the input image signal, and reducing the compensation intensity of the motion compensation processing between images of the input image signal for at least between the image having the index n and an image having the index n+1 when the two images are detected as the same images.

* * * * *